US010531433B2

(12) United States Patent
Frederiks et al.

(10) Patent No.: US 10,531,433 B2
(45) Date of Patent: Jan. 7, 2020

(54) METHODS AND APPARATUS FOR MULTIPLE USER UPLINK ACCESS

(71) Applicant: QUALCOMM Incorporated, San Diego, CA (US)

(72) Inventors: Guido Robert Frederiks, Watsonville, CA (US); Simone Merlin, San Diego, CA (US); Bin Tian, San Diego, CA (US); George Cherian, San Diego, CA (US); Gwendolyn Denise Barriac, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 720 days.

(21) Appl. No.: 14/920,792

(22) Filed: Oct. 22, 2015

(65) Prior Publication Data

US 2016/0128024 A1 May 5, 2016

Related U.S. Application Data

(60) Provisional application No. 62/072,239, filed on Oct. 29, 2014.

(51) Int. Cl.
*H04W 72/04* (2009.01)
*H04B 7/0452* (2017.01)
*H04W 74/08* (2009.01)
*H04W 74/00* (2009.01)

(52) U.S. Cl.
CPC .......... *H04W 72/04* (2013.01); *H04B 7/0452* (2013.01); *H04W 74/006* (2013.01); *H04W 74/085* (2013.01); *H04W 74/0891* (2013.01)

(58) Field of Classification Search
None
See application file for complete search history.

(56) References Cited

U.S. PATENT DOCUMENTS

| | | | |
|---|---|---|---|
| 9,510,368 B2 * | 11/2016 | Timner | H04W 74/006 |
| 2005/0239474 A9 | 10/2005 | Liang et al. | |
| 2006/0187840 A1 | 8/2006 | Cuffaro et al. | |
| 2008/0002734 A1 * | 1/2008 | Zheng | H04B 7/2606 370/445 |

(Continued)

FOREIGN PATENT DOCUMENTS

| | | |
|---|---|---|
| EP | 1215851 A2 | 6/2002 |
| JP | 2013528985 A | 7/2013 |
| WO | WO-2008152597 A1 | 12/2008 |

OTHER PUBLICATIONS

International Search Report and Written Opinion—PCT/US2015/057101—ISA/EPO—Feb. 1, 2016.

(Continued)

*Primary Examiner* — Jutai Kao
(74) *Attorney, Agent, or Firm* — Paradice and Li LLP/Qualcomm

(57) ABSTRACT

Methods and apparatus for multiple user uplink are provided. In one aspect, a method includes receiving, at a wireless device, a trigger message allocating one or more wireless transmission resources, each resource allocated to a plurality of stations. The method further includes determining whether to transmit over the allocated resources based on a contention procedure. The method further includes selectively transmitting over the allocated resources based on said determining.

40 Claims, 17 Drawing Sheets

(56) References Cited

U.S. PATENT DOCUMENTS

| | | | |
|---|---|---|---|
| 2009/0109908 A1* | 4/2009 | Bertrand | H04L 5/0051 |
| | | | 370/329 |
| 2009/0186646 A1* | 7/2009 | Ahn | H04W 16/14 |
| | | | 455/509 |
| 2011/0039568 A1* | 2/2011 | Zhang | H04W 52/50 |
| | | | 455/452.1 |
| 2011/0170515 A1 | 7/2011 | Kim | |
| 2011/0176500 A1* | 7/2011 | Wager | H04W 74/006 |
| | | | 370/329 |
| 2012/0275305 A1 | 11/2012 | Lin | |
| 2013/0010712 A1* | 1/2013 | Kim | H04L 12/413 |
| | | | 370/329 |
| 2013/0235720 A1 | 9/2013 | Wang et al. | |
| 2013/0265906 A1 | 10/2013 | Abraham et al. | |
| 2013/0294356 A1 | 11/2013 | Bala et al. | |
| 2014/0031054 A1* | 1/2014 | Zou | H04W 16/14 |
| | | | 455/452.2 |
| 2014/0198642 A1 | 7/2014 | Barriac et al. | |
| 2015/0016435 A1* | 1/2015 | Hedayat | H04W 76/15 |
| | | | 370/338 |
| 2016/0044724 A1* | 2/2016 | Seo | H04W 76/14 |
| | | | 370/329 |
| 2017/0280482 A1* | 9/2017 | Chatterjee | H04W 74/0833 |

OTHER PUBLICATIONS

Weng C H., et al., "The Performance Study of Optimal Contention Window for IEEE 802.11 DCF Access Control", 2012, IEEE 75th Vehicular Technology Conference (VTC Spring 2012): Yokohama, Japan, May 6-9, 2012, IEEE, Piscataway, NJ, May 6, 2012 (May 6, 2012), pp. 1-5, XP032202678, DOI: 10.1109/VETECS.2012.6240261 ISBN: 978-1-4673-0989-9.

Zhou K., et al., "Contention Based Access for Machine-Type Communications over LTE", 2012 IEEE 75th Vehicular Technology Conference (VTC SPRING 2012): Yokohama, Japan, May 6-9, 2012, IEEE, Piscataway, NJ, May 6, 2012 May 6, 2012), pp. 1-5, XP032202567, DOI: 10.1109/VETECS,2012 .6240150 ISBN: 978-1-4673-0989-9.

Taiwan Search Report—TW104135464—TIPO—Feb. 12, 2019.

* cited by examiner

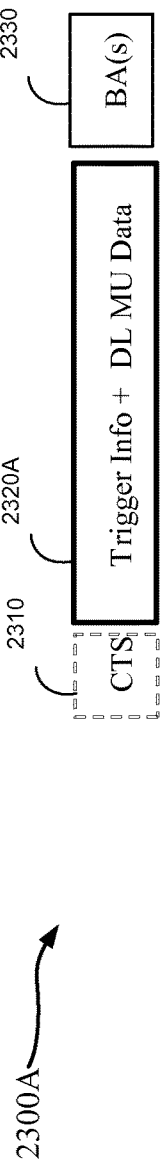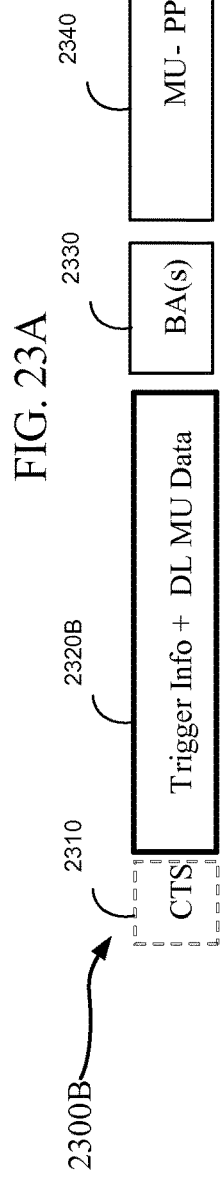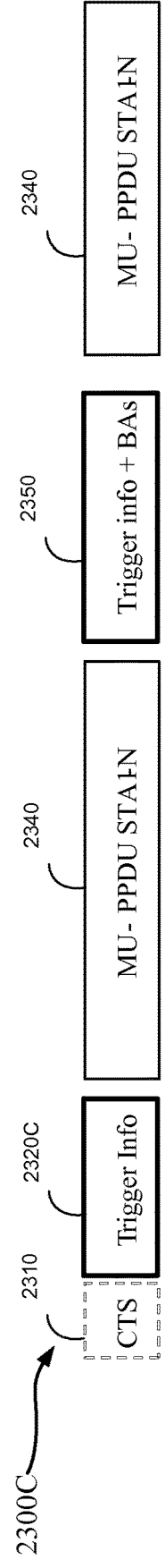
FIG. 23A
FIG. 23B
FIG. 23C
FIG. 23D

METHODS AND APPARATUS FOR MULTIPLE USER UPLINK ACCESS

PRIORITY CLAIM

This application claims the benefit of U.S. Provisional Application No. 62/072,239, filed Oct. 29, 2014, which is hereby incorporated herein by reference in its entirety.

FIELD

Certain aspects of the present disclosure generally relate to wireless communications, and more particularly, to methods and apparatus for multiple user uplink communication in a wireless network.

BACKGROUND

In many telecommunication systems, communications networks are used to exchange messages among several interacting spatially-separated devices. Networks can be classified according to geographic scope, which could be, for example, a metropolitan area, a local area, or a personal area. Such networks can be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infrared, optical, etc. frequency bands. Wireless networks advantageously facilitate user mobility and rapid field deployment when compared to fixed wired networks.

In order to address the issue of increasing bandwidth requirements that are demanded for wireless communications systems, different schemes are being developed to allow multiple stations (STAs) to communicate with a single access point (AP) by sharing the channel resources while achieving high data throughputs. With limited communication resources, it is desirable to reduce the amount of traffic passing between the access point and the multiple terminals. For example, when multiple terminals send uplink communications to the access point, it is desirable to minimize the amount of traffic to complete the uplink of all transmissions. Thus, there is a need for an improved protocol for uplink transmissions from multiple terminals.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the present disclosure provides a method of wireless communication. The method includes receiving, at a wireless device, a trigger message allocating one or more wireless transmission resources, each resource allocated to a plurality of stations. The method further includes determining whether to transmit over the allocated resources based on a contention procedure. The method further includes selectively transmitting over the allocated resources based on said determining.

In various embodiments, the trigger message further allocates one or more wireless transmission resources to a single station. In various embodiments, the trigger message can specify the plurality of stations via one or more of: a prior allocation indication, a group identifier associated with one or more wildcard resources, a portion of a media access control (MAC) or association identification (AID) address of the plurality of stations, and/or a time synchronization function (TSF) criteria. In various embodiments, the wireless transmission resources can include frequency resources, time resources, or a combination thereof.

In various embodiments, determining whether to transmit includes receiving a pruning threshold value within a range of values. Said determining further includes generating a pruning value within the range of values. Said determining further includes comparing the pruning value to the pruning threshold value. Said determining further includes determining whether to transmit based on said comparing. In various embodiments, the method can further include receiving a revised pruning threshold based on success or failure of past transmissions.

In various embodiments, determining whether to transmit includes initializing a backoff counter. Said determining further includes modifying the backoff counter based on allocated resources. In various embodiments, the counter is modified or decremented only when allocated resources are idle. In other embodiments, the counter is modified regardless of whether allocated resources are idle. Said determining further includes determining to transmit when the backoff counter reaches a threshold value. In various embodiments, the method can further include adjusting a backoff window when a collision occurs in the allocated resources.

In various embodiments, determining whether to transmit includes listening to the allocated resources for a listening portion of a preamble period after the trigger message. Said determining further includes transmitting a padding signal when the allocated resources are idle for a duration of the listening portion, until an end of the preamble period. Said determining further includes determining to not to transmit when the allocated resources are not idle for a duration of the listening portion. In various embodiments, the method can further include adjusting a length of the listening portion based on a transmission outcome. In various embodiments, the plurality of stations includes one or more stations of an overlapping basic service set (OBSS).

Another aspect provides an apparatus configured to communicate wirelessly. The apparatus includes a receiver configured to receive a trigger message allocating one or more wireless transmission resources, each resource allocated to a plurality of stations. The apparatus further includes a processor configured to determine whether to transmit over the allocated resources based on a contention procedure. The apparatus further includes a transmitter configured to selectively transmit over the allocated resources based on said determining.

In various embodiments, the trigger message further allocates one or more wireless transmission resources to a single station. In various embodiments, the trigger message can specify the plurality of stations via one or more of: a prior allocation indication, a group identifier associated with one or more wildcard resources, a portion of a media access control (MAC) or association identification (AID) address of the plurality of stations, and/or a time synchronization function (TSF) criteria. In various embodiments, the wireless transmission resources can include frequency resources, time resources, or a combination thereof.

In various embodiments, determining whether to transmit includes receiving a pruning threshold value within a range of values. Said determining further includes generating a pruning value within the range of values. Said determining further includes comparing the pruning value to the pruning threshold value. Said determining further includes determining whether to transmit based on said comparing. In various embodiments, the receiver can be further configured to receive a revised pruning threshold based on success or failure of past transmissions.

In various embodiments, determining whether to transmit includes initializing a backoff counter. Said determining further includes modifying the backoff counter based on allocated resources. In various embodiments, the counter is modified or decremented only when allocated resources are idle. In other embodiments, the counter is modified regardless of whether allocated resources are idle. Said determining further includes determining to transmit when the backoff counter reaches a threshold value. In various embodiments, the processor can be further configured to adjust a backoff window when a collision occurs in the allocated resources.

In various embodiments, determining whether to transmit includes listening to the allocated resources for a listening portion of a preamble period after the trigger message. Said determining further includes transmitting a padding signal when the allocated resources are idle for a duration of the listening portion, until an end of the preamble period. Said determining further includes determining to not to transmit when the allocated resources are not idle for a duration of the listening portion. In various embodiments, the apparatus can further include adjusting a length of the listening portion based on a transmission outcome. In various embodiments, the plurality of stations includes one or more stations of an overlapping basic service set (OBSS).

Another aspect provides another apparatus for wireless communication. The apparatus includes means for receiving a trigger message allocating one or more wireless transmission resources, each resource allocated to a plurality of stations. The apparatus includes means for determining whether to transmit over the allocated resources based on a contention procedure. The apparatus includes means for selectively transmitting over the allocated resources based on said determining.

In various embodiments, the trigger message further allocates one or more wireless transmission resources to a single station. In various embodiments, the trigger message can specify the plurality of stations via one or more of: a prior allocation indication, a group identifier associated with one or more wildcard resources, a portion of a media access control (MAC) or association identification (AID) address of the plurality of stations, and/or a time synchronization function (TSF) criteria. In various embodiments, the wireless transmission resources can include frequency resources, time resources, or a combination thereof.

In various embodiments, means for determining whether to transmit includes means for receiving a pruning threshold value within a range of values. Said means for determining can further include means for generating a pruning value within the range of values. Said means for determining can further include means for comparing the pruning value to the pruning threshold value. Said means for determining can further include means for determining whether to transmit based on said comparing. In various embodiments, the apparatus can further include means for receiving a revised pruning threshold based on success or failure of past transmissions.

In various embodiments, means for determining whether to transmit includes means for initializing a backoff counter. Said means for determining can further include means for modifying the backoff counter based on allocated resources. In various embodiments, the counter is modified or decremented only when allocated resources are idle. In other embodiments, the counter is modified regardless of whether allocated resources are idle. Said means for determining can further include means for determining to transmit when the backoff counter reaches a threshold value. In various embodiments, the apparatus can further include means for adjusting a backoff window when a collision occurs in the allocated resources.

In various embodiments, means for determining whether to transmit includes means for listening to the allocated resources for a listening portion of a preamble period after the trigger message. Said means for determining can further include means for transmitting a padding signal when the allocated resources are idle for a duration of the listening portion, until an end of the preamble period. Said means for determining can further include means for determining to not to transmit when the allocated resources are not idle for a duration of the listening portion. In various embodiments, the apparatus can further include means for adjusting a length of the listening portion based on a transmission outcome. In various embodiments, the plurality of stations includes one or more stations of an overlapping basic service set (OBSS).

Another aspect provides a non-transitory computer-readable medium. The medium includes code that, when executed, causes the apparatus to receive a trigger message allocating one or more wireless transmission resources, each resource allocated to a plurality of stations. The medium further includes code that, when executed, causes the apparatus to determine whether to transmit over the allocated resources based on a contention procedure. The medium further includes code that, when executed, causes the apparatus to selectively transmit over the allocated resources based on said determining.

In various embodiments, the trigger message further allocates one or more wireless transmission resources to a single station. In various embodiments, the trigger message can specify the plurality of stations via one or more of: a prior allocation indication, a group identifier associated with one or more wildcard resources, a portion of a media access control (MAC) or association identification (AID) address of the plurality of stations, and/or a time synchronization function (TSF) criteria. In various embodiments, the wireless transmission resources can include frequency resources, time resources, or a combination thereof.

In various embodiments, determining whether to transmit includes receiving a pruning threshold value within a range of values. Said determining further includes generating a pruning value within the range of values. Said determining further includes comparing the pruning value to the pruning threshold value. Said determining further includes determining whether to transmit based on said comparing. In various embodiments, the medium can further include code that, when executed, causes the apparatus to receive a revised pruning threshold based on success or failure of past transmissions.

In various embodiments, determining whether to transmit includes initializing a backoff counter. Said determining further includes modifying the backoff counter based on allocated resources. In various embodiments, the counter is modified or decremented only when allocated resources are idle. In other embodiments, the counter is modified regardless of whether allocated resources are idle. Said determining further includes determining to transmit when the backoff counter reaches a threshold value. In various embodiments, the medium can further include adjusting a backoff window when a collision occurs in the allocated resources.

In various embodiments, determining whether to transmit includes listening to the allocated resources for a listening portion of a preamble period after the trigger message. Said determining further includes transmitting a padding signal when the allocated resources are idle for a duration of the listening portion, until an end of the preamble period. Said determining further includes determining to not to transmit when the allocated resources are not idle for a duration of the listening portion. In various embodiments, the medium can further include code that, when executed, causes the apparatus to adjust a length of the listening portion based on a transmission outcome. In various embodiments, the plurality of stations includes one or more stations of an overlapping basic service set (OBSS).

BRIEF DESCRIPTION OF THE DRAWINGS

FIGS. 23A-23D show time sequence diagrams that illustrate various embodiments of A-PPDU trigger exchanges.

DETAILED DESCRIPTION

Figure 1:
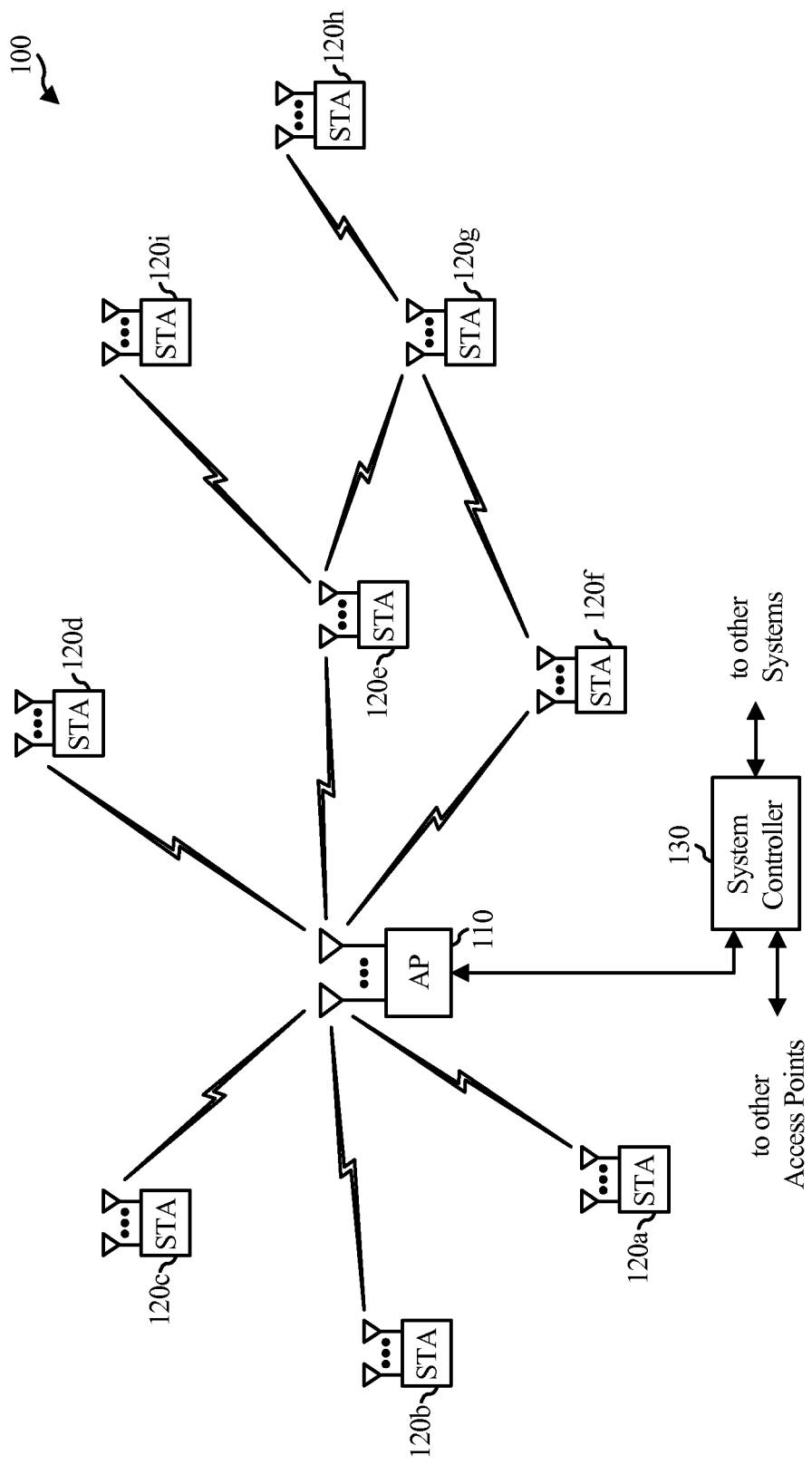
FIG. 1 illustrates a multiple-access multiple-input multiple-output (MIMO) system with access points and STAs.

Various aspects of the novel systems, apparatuses, and methods are described more fully hereinafter with reference to the accompanying drawings. The teachings disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies can include various types of wireless local area networks (WLANs). A WLAN can be used to interconnect nearby devices together, employing widely used networking protocols. The various aspects described herein can apply to any communication standard, such as Wi-Fi or, more generally, any member of the Institute of Electrical and Electronics Engineers (IEEE) 802.11 family of wireless protocols.

In some aspects, wireless signals can be transmitted according to a high-efficiency 802.11 protocol using orthogonal frequency-division multiplexing (OFDM), direct-sequence spread spectrum (DSSS) communications, a combination of OFDM and DSSS communications, or other schemes. Implementations of the high-efficiency 802.11 protocol can be used for Internet access, sensors, metering, smart grid networks, or other wireless applications. Advantageously, aspects of certain devices implementing this particular wireless protocol can consume less power than devices implementing other wireless protocols, can be used to transmit wireless signals across short distances, and/or can be able to transmit signals less likely to be blocked by objects, such as humans.

In some implementations, a WLAN includes various devices which are the components that access the wireless network. For example, there can be two types of devices: access points (APs) and clients (also referred to as stations, or STAs). In general, an AP serves as a hub or base station for the WLAN and a STA serves as a user of the WLAN. For example, a STA can be a laptop computer, a personal digital assistant (PDA), a mobile phone, etc. In an example, a STA connects to an AP via a Wi-Fi (e.g., IEEE 802.11 protocol such as 802.11ah) compliant wireless link to obtain general connectivity to the Internet or to other wide area networks. In some implementations a STA can also be used as an AP.

The techniques described herein can be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system can utilize sufficiently different directions to simultaneously transmit data belonging to multiple STAs. A TDMA system can allow multiple STAs to share the same frequency channel by dividing the transmission signal into different time slots, each time slot being assigned to different STA. A TDMA system can implement Global System for Mobile Communications (GSM) or some other standards known in the art. An OFDMA system utilizes orthogonal frequency division multiplexing (OFDM), which is a modulation technique that partitions the overall system bandwidth into multiple orthogonal sub-carriers. These sub-carriers can also be called tones, bins, etc. With OFDM, each sub-carrier can be independently modulated with data. An OFDM system can implement IEEE 802.11 or some other standards known in the art. An SC-FDMA system can utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system can implement 3GPP-LTE (3rd Generation Partnership Project Long Term Evolution) or other standards.

The teachings herein can be incorporated into (e.g., implemented within or performed by) a variety of wired or wireless apparatuses (e.g., nodes). In some aspects, a wireless node implemented in accordance with the teachings herein can comprise an access point or an access terminal.

An access point (AP) can comprise, be implemented as, or known as a NodeB, Radio Network Controller (RNC), eNodeB, Base Station Controller (BSC), Base Transceiver Station (BTS), Base Station (BS), Transceiver Function "TF), Radio Router, Radio Transceiver, Basic Service Set (BSS), Extended Service Set (ESS), Radio Base Station (RBS), or some other terminology.

A station (STA) can also comprise, be implemented as, or known as a STA, an access terminal (AT), a subscriber station, a subscriber unit, a mobile station, a remote station, a remote terminal, a user agent, a user device, user equipment, user terminal, or some other terminology. In some implementations an access terminal can comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein can be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

FIG. 1 is a diagram that illustrates wireless communication system 100, configured for multiple-access multiple-input multiple-output (MIMO), with access points and STAs. For simplicity, only one AP 110 is shown in FIG. 1. An access point generally communicates with the STAs and can also be referred to as a base station or other terminology. A STA can be fixed or mobile and can also be referred to as a mobile station or a wireless device, or using some other terminology. The AP 110 can communicate with one or more STAs 120 at any given moment on a downlink and/or uplink. The downlink (i.e., forward link) is the communication link from the access point to the STAs, and the uplink (i.e., reverse link) is the communication link from the STAs to the access point. A STA can also communicate peer-to-peer with another STA. A system controller 130 couples to and provides coordination and control for the access points.

While portions of the following disclosure will describe STAs 120 capable of communicating via Spatial Division Multiple Access (SDMA), for certain aspects, the STAs 120 can also include some STAs that do not support SDMA. Thus, for such aspects, the AP 110 can be configured to communicate with both SDMA and non-SDMA STAs. This approach can conveniently allow older versions of STAs ("legacy" stations) that do not support SDMA to remain deployed in an enterprise, extending their useful lifetime, while allowing newer SDMA STAs to be introduced as deemed appropriate.

The wireless communication system 100 employs multiple transmit and multiple receive antennas for data transmission on the downlink and uplink. The AP 110 is equipped with $N_{ap}$ number of antennas and represents the multiple-input (MI) for downlink transmissions and the multiple-output (MO) for uplink transmissions. A set of K number of selected STAs 120 collectively represents the multiple-output for downlink transmissions and the multiple-input for uplink transmissions. For pure SDMA, it is desired to have $N_{ap} \leq K \leq 1$ if the data symbol streams for the K number of STAs are not multiplexed in code, frequency or time. The value of K can be greater than the value of $N_{ap}$ if the data symbol streams can be multiplexed using TDMA technique, different code channels with CDMA, disjoint sets of sub-bands with OFDM, and so on. Each selected STA can transmit user-specific data to and/or receive user-specific data from the access point. In general, each selected STA can be equipped with one or multiple antennas. The K number of selected STAs can have the same number of antennas, or one or more STAs can have a different number of antennas.

The wireless communication system 100, when configured for SDMA, can be a time division duplex (TDD) system or a frequency division duplex (FDD) system. For a TDD system, the downlink and uplink share the same frequency band. For an FDD system, the downlink and uplink use different frequency bands. The wireless communication system 100 can also utilize a single carrier or multiple carriers for transmission. Each STA can be equipped with a single antenna or multiple antennas. The wireless communication system 100 can also be a TDMA system if the STAs 120 share the same frequency channel by dividing transmission/reception into different time slots, where each time slot can be assigned to a different STA 120.

Figure 2:
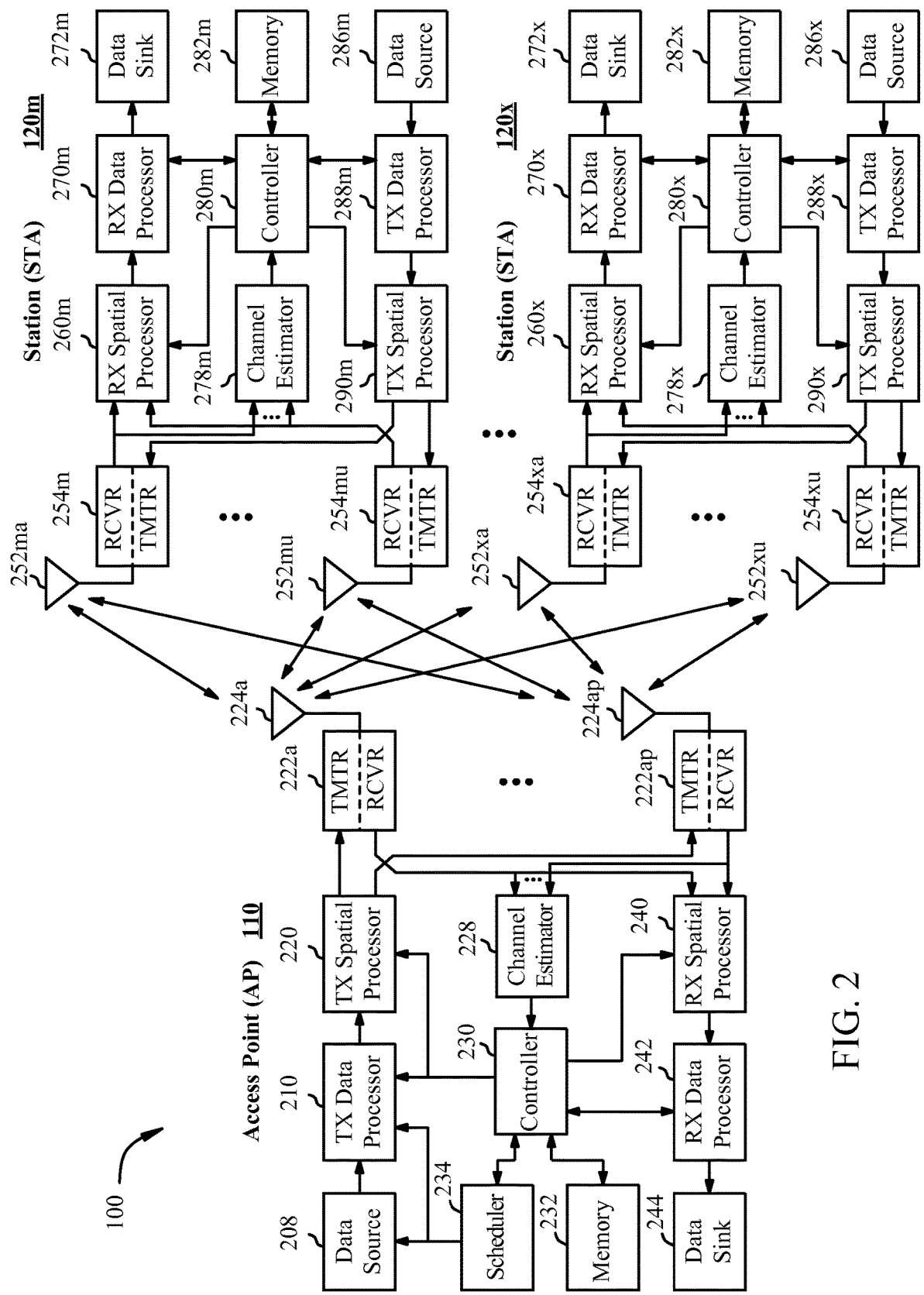
FIG. 2 illustrates a block diagram of the AP 110 and two STAs 120m and 120x in a MIMO system.

FIG. 2 illustrates a block diagram of the AP 110 and two STAs 120*m* and 120*x* in wireless communication system 100. The AP 110 is equipped with $N_r$ number of antennas 224*a* through 224*ap*. The STA 120*m* is equipped with $N_{ut,m}$ number of antennas $252_{ma}$ through $252_{mu}$, and the STA 120*x* is equipped with $N_{ut,x}$ number of antennas $252_{xa}$ through $252_{xu}$. The AP 110 is a transmitting entity for the downlink and a receiving entity for the uplink. The STA 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink. $N_{up}$ number of STAs are selected for simultaneous transmission on the uplink, and $N_{dn}$ STAs are selected for simultaneous transmission on the downlink. The value of $N_{up}$ may or may not be equal to the value of $N_{dn}$, and the value of $N_{up}$ and the value of $N_{dn}$ can be static values or can change for each scheduled communication interval. Beam-steering or some other spatial processing technique can be used at the AP 110 and/or the STA 120.

On the uplink, at each STA 120 selected for uplink transmission, a TX data processor 288 receives traffic data from a data source 286 and control data from a controller 280. The TX data processor 288 processes (e.g., encodes, interleaves, and modulates) the traffic data for the STA based on the coding and modulation schemes associated with the rate selected for the STA and provides a data symbol stream. A TX spatial processor 290 performs spatial processing on the data symbol stream and provides $N_{ut,m}$ number of transmit symbol streams for the $N_{ut,m}$ number of antennas. Each transmitter unit (TMTR) 254 receives and processes (e.g., converts to analog, amplifies, filters, and frequency upconverts) a respective transmit symbol stream to generate an uplink signal. $N_{ut,m}$ number of transmitter units 254 provide $N_{ut,m}$ number of uplink signals for transmission from $N_{ut,m}$ number of antennas 252, for example to transmit to the AP 110.

$N_{up}$ number of STAs can be scheduled for simultaneous transmission on the uplink. Each of these STAs can perform spatial processing on its respective data symbol stream and transmit its respective set of transmit symbol streams on the uplink to the AP 110.

At the AP 110, $N_{up}$ number of antennas 224*a* through 224*ap* receive the uplink signals from all $N_{up}$ number of STAs transmitting on the uplink. Each antenna 224 provides a received signal to a respective receiver unit (RCVR) 222. Each receiver unit 222 performs processing complementary to that performed by transmitter unit 254 and provides a received symbol stream. A receive (RX) spatial processor 240 performs receiver spatial processing on the $N_{up}$ number of received symbol streams from $N_{up}$ number of receiver units 222 and provides $N_{up}$ number of recovered uplink data symbol streams. The receiver spatial processing can be performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective STA. An RX data processor 242 processes (e.g., demodulates, deinterleaves, and decodes) each recovered uplink data symbol stream in accordance with the rate used for that stream to obtain decoded data. The decoded data for each STA can be provided to a data sink 244 for storage and/or a controller 230 for further processing.

On the downlink, at the AP 110, a TX data processor 210 receives traffic data from a data source 208 for $N_{dn}$ number of STAs scheduled for downlink transmission, control data from a controller 230, and possibly other data from a scheduler 234. The various types of data can be sent on different transport channels. TX data processor 210 processes (e.g., encodes, interleaves, and modulates) the traffic data for each STA based on the rate selected for that STA. The TX data processor 210 provides $N_{dn}$ number of downlink data symbol streams for the $N_{dn}$ number of STAs. A TX spatial processor 220 performs spatial processing (such as precoding or beamforming) on the $N_{dn}$ number of downlink data symbol streams, and provides $N_{up}$ number of transmit symbol streams for the $N_{up}$ number of antennas. Each transmitter unit 222 receives and processes a respective transmit symbol stream to generate a downlink signal. $N_{up}$ number of transmitter units 222 can provide $N_{up}$ number of downlink signals for transmission from $N_{up}$ number of antennas 224, for example to transmit to the STAs 120.

At each STA 120, $N_{ut,m}$ number of antennas 252 receive the $N_{up}$ number of downlink signals from the AP 110. Each receiver unit 254 processes a received signal from an associated antenna 252 and provides a received symbol stream. An RX spatial processor 260 performs receiver spatial processing on $N_{ut,m}$ number of received symbol streams from $N_{ut,m}$ number of receiver units 254 and provides a recovered downlink data symbol stream for the STA 120. The receiver spatial processing can be performed in accordance with the CCMI, MMSE, or some other technique. An RX data processor 270 processes (e.g., demodulates, deinterleaves and decodes) the recovered downlink data symbol stream to obtain decoded data for the STA.

At each STA 120, a channel estimator 278 estimates the downlink channel response and provides downlink channel estimates, which can include channel gain estimates, signal-to-noise ratio (SNR) estimates, noise variance and so on.

Similarly, a channel estimator 228 estimates the uplink channel response and provides uplink channel estimates. Controller 280 for each STA typically derives the spatial filter matrix for the STA based on the downlink channel response matrix $H_{dn,m}$ for that STA. Controller 230 derives the spatial filter matrix for the access point based on the effective uplink channel response matrix $H_{up,eff}$. The controller 280 for each STA can send feedback information (e.g., the downlink and/or uplink eigenvectors, eigenvalues, SNR estimates, and so on) to the AP 110. The controllers 230 and 280 can also control the operation of various processing units at the AP 110 and STA 120, respectively.

Figure 3:
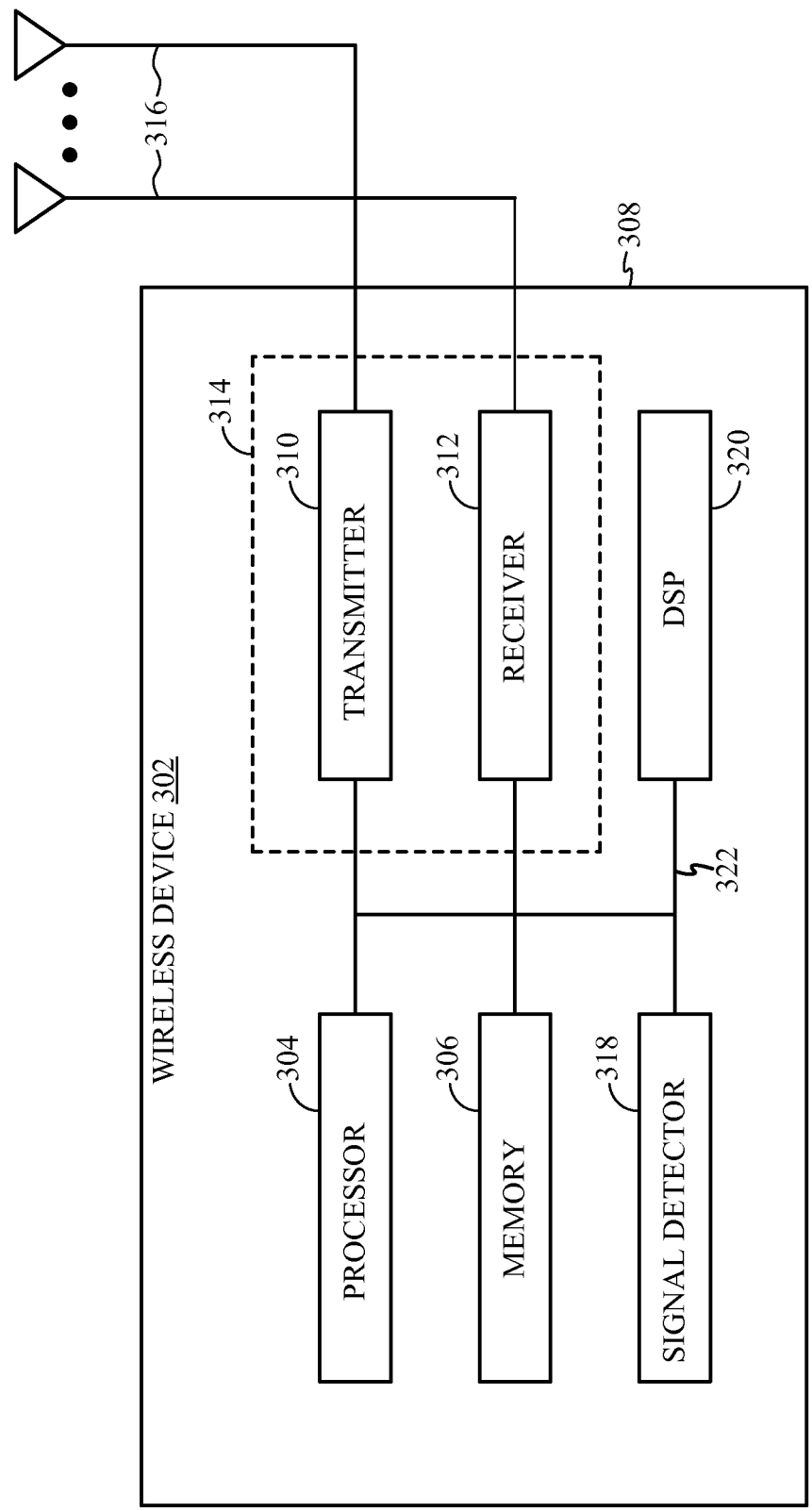
FIG. 3 illustrates various components that can be utilized in a wireless device (such as an access point or a station) that can be employed within the wireless communication system of FIG. 1.

FIG. 3 illustrates various components that can be utilized in a wireless device 302 (such as an access point or a station) that can be employed within the wireless communication system 100 of FIG. 1. The wireless device 302 is an example of a device that can be configured to implement the various methods described herein. The wireless device 302 can implement the AP 110 or a STA 120.

The wireless device 302 can include a processor 304 which controls operation of the wireless device 302. The processor 304 can also be referred to as a central processing unit (CPU). Memory 306, which can include both read-only memory (ROM) and random access memory (RAM), provides instructions and data to the processor 304. A portion of the memory 306 can also include non-volatile random access memory (NVRAM). The processor 304 can perform logical and arithmetic operations based on program instructions stored within the memory 306. The instructions in the memory 306 can be executable to implement the methods described herein.

The processor 304 can comprise or be a component of a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system can also include machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein.

The wireless device 302 can also include a housing 308 that can include a transmitter 310 and a receiver 312 to allow transmission and reception of data between the wireless device 302 and a remote location. The transmitter 310 and receiver 312 can be combined into a transceiver 314. A single or a plurality of transceiver antennas 316 can be attached to the housing 308 and electrically coupled to the transceiver 314. The wireless device 302 can also include multiple transmitters, multiple receivers, and multiple transceivers.

The wireless device 302 can also include a signal detector 318 that can be used in an effort to detect and quantify the level of signals received by the transceiver 314. The signal detector 318 can detect such signals as total energy, energy per subcarrier per symbol, power spectral density and other signals. The wireless device 302 can also include a digital signal processor (DSP) 320 for use in processing signals.

The various components of the wireless device 302 can be coupled together by a bus system 322, which can include a power bus, a control signal bus, and a status signal bus in addition to a data bus.

Certain aspects of the present disclosure support transmitting an uplink (UL) signal from multiple STAs to an AP. In some embodiments, the UL signal can be transmitted in a multi-user MIMO (MU-MIMO) system. Alternatively, the UL signal can be transmitted in a multi-user FDMA (MU-FDMA) or similar FDMA system. Specifically, FIGS. 4-7, 10-11, and 16-20 illustrate UL-MU-MIMO transmissions 410A, 410B, 1050A, and 1050B that would apply equally to UL-FDMA transmissions. In these embodiments, UL-MU-MIMO or UL-FDMA transmissions can be sent simultaneously from multiple STAs to an AP and can create efficiencies in wireless communication.

Figure 4:
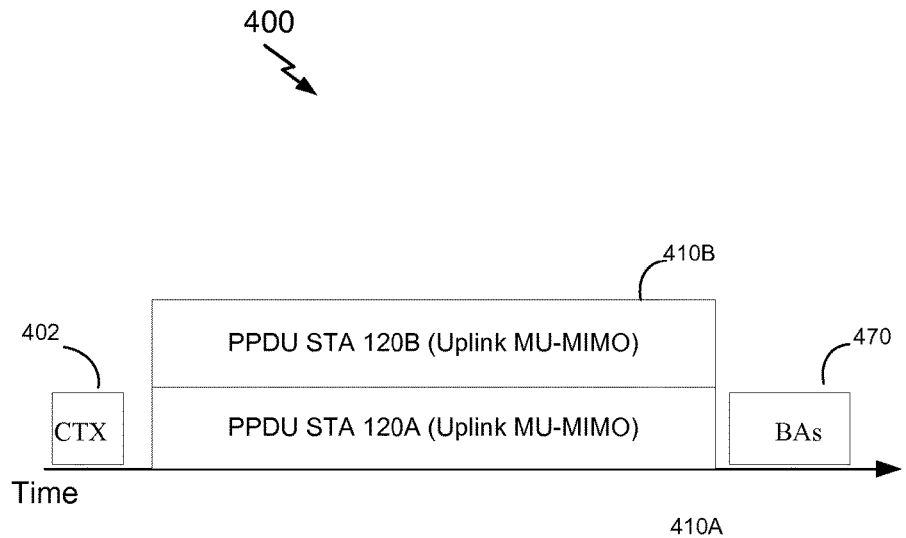
FIG. 4 shows a transmission and reception time diagram of an example of a frame exchange including an uplink (UL) MU-MIMO communication.

FIG. 4 is a transmission and reception time diagram illustrating an example of an UL-MU-MIMO protocol 400 that can be used for UL communications. As shown in FIG. 4 and in conjunction with FIG. 1, the AP 110 can transmit a clear to transmit (CTX) message 402 to the STAs 120 indicating which STAs can participate in the UL-MU-MIMO scheme, such that a particular STA knows to start an UL-MU-MIMO. An example of a CTX frame structure is described more fully below with reference to FIGS. 12-15.

Once a STA 120 receives a CTX message 402 from the AP 110 where the STA is listed, the STA can transmit the UL-MU-MIMO transmission 410. In FIG. 4, STA 120a and STA 120B transmit UL-MU-MIMO transmission 410A and 410B containing physical layer convergence protocol (PLCP) protocol data units (PPDUs). Upon receiving the UL-MU-MIMO transmission 410, the AP 110 can transmit block acknowledgments (BAs) 470 to the STAs 120.

Not all APs or STAs 120 can support UL-MU-MIMO or UL-FDMA operation. A capability indication from a STA 120 can be indicated in a high efficiency wireless (HEW) capability element that is included in an association request or probe request and can include a bit indicating capability, the maximum number of spatial streams a STA 120 can use in a UL-MU-MIMO transmission, the frequencies a STA 120 can use in a UL-FDMA transmission, the minimum and maximum power and granularity in the power backoff, and the minimum and maximum time adjustment a STA 120 can perform.

A capability indication from an AP can be indicated in a HEW capability element that is included in an association response, beacon or probe response and can include a bit indicating capability, the maximum number of spatial streams a single STA 120 can use in a UL-MU-MIMO transmission, the frequencies a single STA 120 can use in a UL-FDMA transmission, the required power control granularity, and the required minimum and maximum time adjustment a STA 120 should be able to perform.

In one embodiment, capable STAs 120 can request to a capable AP to be part of the UL-MU-MIMO (or UL-FDMA) protocol by sending a management frame to AP indicating request for enablement of the use of UL-MU-MIMO feature. In one aspect, the AP 110 can respond by granting the use of the UL-MU-MIMO feature or denying it. Once the use of the UL-MU-MIMO is granted, the STA 120 can expect a CTX message 402 at a variety of times. Additionally, once a STA 120 is enabled to operate the UL-MU-MIMO feature, the STA 120 can be subject to follow a certain operation mode. If multiple operation modes are possible, an AP can indicate to the STA 120 which mode to use in a HEW capability element or in an operation element. In one aspect the STAs 120 can change the operation modes and parameters dynamically during operation by sending a different operating element to the AP 110. In another aspect the AP 110 can switch operation modes dynamically during operation by sending an updated operating element to a STA 120 or in a beacon. In another aspect, the operation modes can be indicated in the setup phase and can be setup per STA 120 or for a group of STAs 120. In another aspect the operation mode can be specified per traffic identifier (TID).

Figure 5:
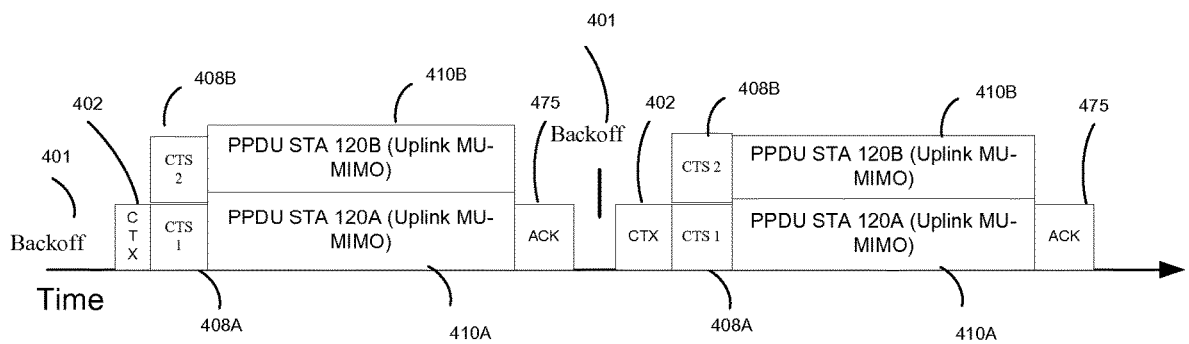
FIG. 5 shows a transmission and reception time diagram of another example of a frame exchange of an UL-MU-MIMO communication.

FIG. 5 is a transmission and reception time diagram that, in conjunction with FIG. 1, illustrates an example of an operation mode of a UL-MU-MIMO transmission. In this embodiment, a STA 120 receives a CTX message 402 from the AP 110 and sends an immediate response to the AP 110. The response can be in the form of a clear to send (CTS) 408 or another similar signal. In one aspect, requirement to send a CTS can be indicated in the CTX message 402 or can be indicated in the setup phase of the communication. As shown in FIG. 5, STA 120a and STA 120B can transmit a CTS 1 408A and CTS 2 408B message in response to receiving the CTX message 402. The modulation and coding scheme (MCS) of the CTS 1 408A and CTS 2 408B can be based on the MCS of the CTX message 402. In this embodiment, CTS 1 408A and CTS 2 408B contain the same bits and the same scrambling sequence so that they can be transmitted to the AP 110 at the same time. The duration field of the CTS 408 signals can be based on the duration field in the CTX by removing the time for the CTX PPDU. The UL-MU-MIMO transmission 410A and 410B are then sent by the STAs 120a and 120B as listed in the CTX 402 signals. The AP 110 can then send acknowledgment (ACK) signals the STAs 120a and 120B. In some aspects, the ACK signals can be serial ACK signals to each station or BAs. In some aspects the ACKs can be polled. This embodiment creates efficiencies by simultaneously transmitting CTS 408 signals from multiple STAs to the AP 110 instead of sequentially, which saves time and reduces the possibility of interference.

Figure 6:
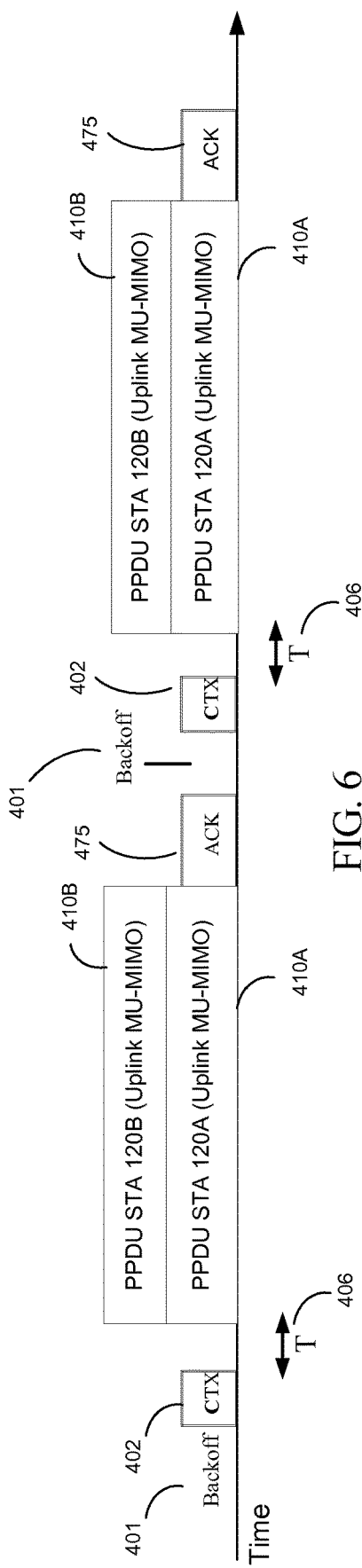
FIG. 6 shows a transmission and reception time diagram of another example of a frame exchange of an UL-MU-MIMO communication.

FIG. 6 is a transmission and reception time diagram that, in conjunction with FIG. 1, illustrates another example of an operation mode of a UL-MU-MIMO transmission. In this embodiment, STAs 120a and 120B receive a CTX message 402 from the AP 110 and are allowed to start and UL-MU-MIMO transmission a time (T) 406 after the end of the PPDU carrying the CTX message 402. The time T 406 can be a short interframe space (SIFS), point interframe space (PIFS), or another time potentially adjusted with additional offsets as indicated by the AP 110 in the CTX message 402 or via a management frame. The SIFS and PIFS time can be fixed in a standard or indicated by the AP 110 in the CTX message 402 or in a management frame. One advantage of specifying the time T 406 can be to improve synchronization or to allow a STAs 120a and 120B time to process the CTX message 402 or other messages before transmission.

Referring to FIGS. 4-6, in conjunction with FIG. 1, the UL-MU-MIMO transmission 410 can have the same duration as other UL-MU-MIMO transmissions. The duration of the UL-MU-MIMO transmission 410 for STAs utilizing the UL-MU-MIMO feature can be indicated in the CTX message 402 or during the setup phase. To generate a PPDU of the required duration, a STA 120 can build a PLCP service data unit (PSDU) so that the length of the PPDU matches the length indicated in the CTX message 402. In another aspect, a STA 120 can adjust the level of data aggregation in a media access control (MAC) protocol data unit (A-MPDU) or the level of data aggregation in a MAC service data units (A-MSDU) to approach the target length. In another aspect, a STA 120 can add end of file (EOF) padding delimiters to reach the target length. In another approach the padding or the EOF pad fields are added at the beginning of the A-MPDU. One of the benefits of having all the UL-MU-MIMO transmissions the same length is that the power level of the transmission will remain constant.

In some embodiments, a STA 120 can have data to upload to the AP but the STA 120 has not received a CTX message 402 or other signal indicating that the STA 120 can start a UL-MU-MIMO transmission.

Figure 7:
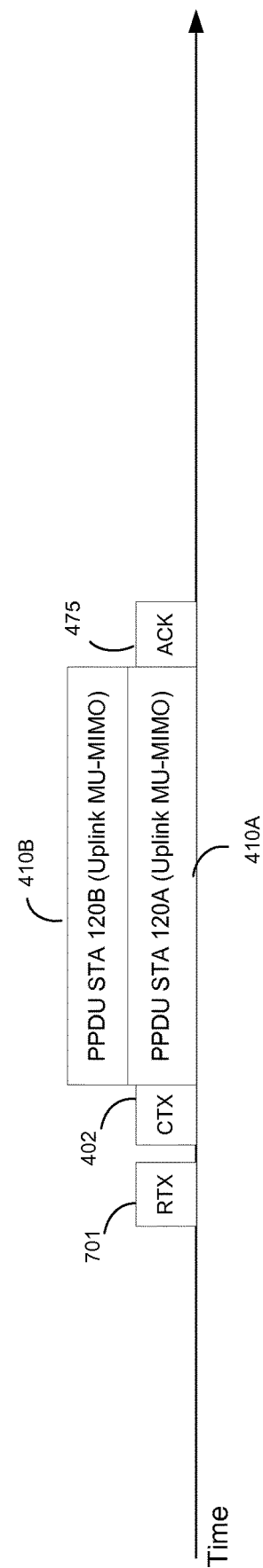
FIG. 7 shows a transmission and reception time diagram of another example of a frame exchange of an UL-MU-MIMO communication.

In one operation mode, the STAs 120 are not allowed to transmit outside an UL-MU-MIMO transmission opportunity (TXOP) (e.g., after CTX message 402). In another operation mode STAs 120 can transmit frames to initialize a UL-MU-MIMO transmission, and then can transmit during the UL-MU-MIMO TXOP, if for example, they are instructed to do so in a CTX message 402. In one embodiment, the frame to initialize a UL-MU-MIMO transmission can be a request to transmit (RTX), a frame specifically designed for this purpose (an example of a RTX frame structure is described more fully below with reference to FIGS. 8 and 9). The RTX frames can be the only frames a STA 120 is allowed to use to initiate a UL MU MIMO TXOP. In one embodiment, the STA may not transmit outside an UL-MU-MIMO TXOP other than by sending an RTX. In another embodiment, a frame to initialize an UL MU MIMO transmission can be any frame which indicates to the AP 110 that a STA 120 has data to send. It can be pre-negotiated that these frames indicate a UL MU MIMO TXOP request. For example, the following can be used to indicate that a STA 120 has data to send and is requesting an UL MU MIMO TXOP: a ready-to-send (RTS), a data frame or Quality-of-Service (QoS) Null frame with bits 8-15 of the QoS control frame set to indicate more data, or a power save (PS) poll. In one embodiment, the STA may not transmit outside an UL MU MIMO TXOP other than by sending frames to trigger this TXOP, where this frame can be an RTS, PS poll, or QoS null. In another embodiment, the STA can send single user uplink data as usual, and can indicate a request for a UL MU MIMO TXOP by setting bits in the QoS control frame of its data packet. FIG. 7 is a transmission and reception time diagram illustrating, in conjunction with FIG. 1, an example where the frame to initialize a UL-MU-MIMO is a RTX 701. In this embodiment the STA 120 sends to the AP 110 a RTX 701 that includes information regarding the UL-MU-MIMO transmission. As shown in FIG. 7, the AP 110 can respond to the RTX 701 with a CTX message 402 granting an UL-MU-MIMO TXOP to send the UL-MU-MIMO transmission 410 immediately following the CTX message 402. In another aspect, the AP 110 can respond with a CTS that grants a single-user (SU) UL TXOP. In another aspect, the AP 110 can respond with a frame (e.g., ACK or CTX with a special indication) that acknowledges the reception of the RTX 701 but does not grant an immediate UL-MU-MIMO TXOP. In another aspect, the AP 110 can respond with a frame that acknowledges the reception of the RTX 701, does not grant an immediate UL-MU-MIMO TXOP, but grants a delayed UL-MU-MIMO TXOP and can identify the time of the TXOP is granted. In this embodiment, the AP 110 can send a CTX message 402 to start the UL-MU-MIMO at the granted time.

In another aspect, the AP 110 can respond to the RTX 701 with an ACK or other response signal which does not grant the STA 120 an UL-MU-MIMO transmission but indicates that the STA 120 shall wait for a time (T) before attempting another transmission (e.g., sending another RTX). In this aspect the time (T) can be indicated by the AP 110 in the setup phase or in the response signal. In another aspect the AP 110 and a STA 120 can agree on a time which the STA 120 can transmit a RTX 701, RTS, PS-poll, or any other request for a UL-MU-MIMO TXOP.

In another operation mode, STAs 120 can transmit requests for UL-MU-MIMO transmissions 410 in accordance with regular contention protocol. In another aspect, the contention parameters for STAs 120 using UL-MU-MIMO are set to a different value than for other STAs that are not using the UL-MU-MIMO feature. In this embodiment, the AP 110 can indicate the value of the contention parameters in a beacon, association response or through a management frame. In another aspect, the AP 110 can provide a delay timer that prevents a STA 120 from transmitting for a certain amount of time after each successful UL-MU-MIMO TXOP or after each RTX, RTS, PS-poll, or QoS null frame. The timer can be restarted after each successful UL-MU-MIMO TXOP. In one aspect, the AP 110 can indicate the delay timer to STAs 120 in the setup phase or the delay timer can be different for each STA 120. In another aspect, the AP 110 can indicate the delay timer in the CTX message 402 or the delay timer can be dependent on the order of the STAs 120 in the CTX message 402, and can be different for each terminal.

In another operational mode, the AP 110 can indicate a time interval during which the STAs 120 are allowed to transmit a UL-MU-MIMO transmission. In one aspect, the AP 110 indicates a time interval to the STAs 120 during which the STAs are allowed to send a RTX or RTS or other request to the AP 110 to ask for an UL-MU-MIMO transmission. In this aspect, the STAs 120 can use regular contention protocol. In another aspect, the STAs may not initiate a UL-MU-MIMO transmission during the time interval but the AP 110 can send a CTX or other message to the STAs to initiate the UL-MU-MIMO transmission.

In certain embodiments, a STA 120 enabled for UL-MU-MIMO can indicate to the AP 110 that it requests an UL-MU-MIMO TXOP because it has data pending for UL. In one aspect, the STA 120 can send a RTS or a PS-poll to request a UL-MU-MIMO TXOP. In another embodiment, the STA 120 can send any data frame, including a quality of service (QoS) null data frame, where the bits 8-15 of the QoS control field indicate a non-empty queue. In this embodiment the STA 120 can determine during the setup phase which data frames (e.g., RTS, PS-poll, QoS null, etc.) will trigger a UL-MU-MIMO transmission when the bits 8-15 of the QoS control field indicate a non-empty queue. In one embodiment, the RTS, PS-poll, or QoS null frames can include a 1 bit indication allowing or disallowing the AP 110 to respond with a CTX message 402. In another embodiment, the QoS null frame can include TX power information and a per TID queue information. The TX power information and per TID queue information can be inserted in the two bytes of the sequence control and QoS controls fields in a QoS null frame and the modified QoS null frame can be sent to the AP 110 to request a UL-MU-MIMO TXOP. In another embodiment, referring to FIGS. 1 and 7, the STA 120 can send a RTX 701 to request a UL-MU-MIMO TXOP.

In response to receiving an RTS, RTX, PS-poll or QoS null frame, or other trigger frame as described above, the AP 110 can send a CTX message 402. In one embodiment, referring to FIG. 7, after the transmission of the CTX message 402 and the completion of the UL-MU-MIMO transmissions 410A and 410B, the TXOP returns to the STAs 120a and 120B which can decide on how to use the remaining TXOP. In another embodiment, referring to FIG. 7, after the transmission of the CTX message 402 and the completion of the UL-MU-MIMO transmissions 410A and 410B, TXOP remains with the AP 110 and the AP110 can use the remaining TXOP for additional UL-MU-MIMO transmissions by sending another CTX message 402 to either STAs 120a and 120B or to other STAs.

Figure 8:
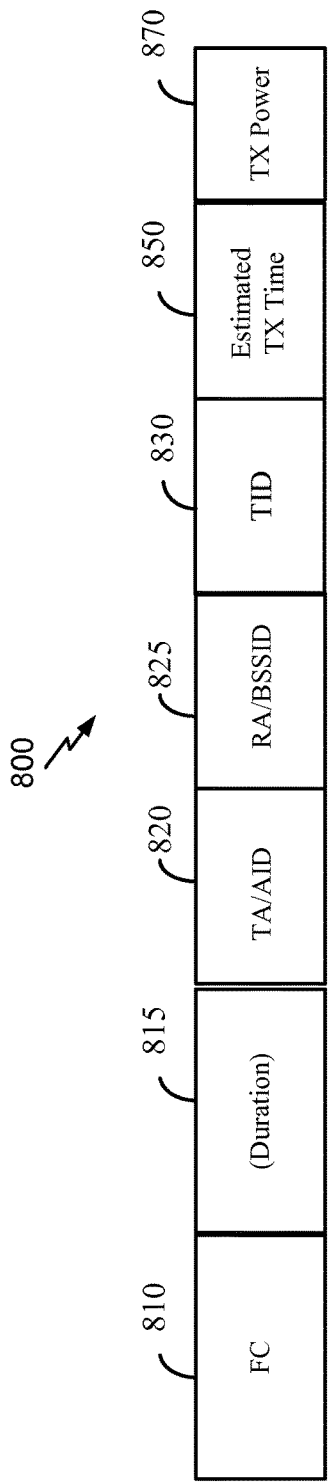
FIG. 8 shows a diagram of one embodiment of a request to transmit (RTX) frame.

FIG. 8 is a diagram of one embodiment of a RTX frame 800. The RTX frame 800 includes a frame control (FC) field 810, a duration field 815 (optional), a transmitter address (TA)/allocation identifier (AID) field 820, a receiver address (RA)/basic service set identifier (BSSID) field 825, a TID field 830, an estimated transmission (TX) time field 850, and a TX power field 870. The FC field 810 indicates a control subtype or an extension subtype. The duration field 815 indicates to any receiver of the RTX frame 800 to set the network allocation vector (NAV). In one aspect, the RTX frame 800 may not have a duration field 815. The TA/AID field 820 indicates the source address which can be an AID or a full MAC address. The RA/BSSID field 825 indicates the RA or BSSID. In one aspect the RTX frame may not contain a RA/BSSID field 825. The TID field 830 indicates the access category (AC) for which the user has data. The Estimated TX time field 850 indicates the time requested for the UL-TXOP and can be the time required for a STA 120 to send all the data in its buffer at the current planned MCS. The TX power field 870 indicates the power at which the frame is being transmitted and can be used by the AP to estimate the link quality and adapt the power backoff indication in a CTX frame.

Figure 9:
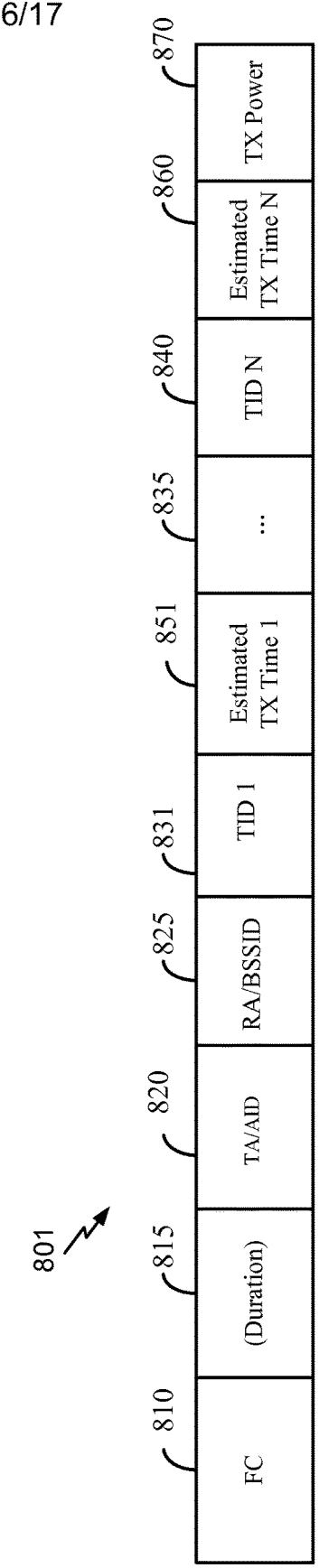
FIG. 9 shows a diagram of another embodiment of a RTX frame.

FIG. 9 is a diagram of another embodiment of a RTX frame 801. In this embodiment, the RTX frame 801 contains a TID field and an Estimated TX time field for each access class listed in the RTX 801 frame (TID fields 831 and 840 and Estimated TX time fields 851, 860).

Before an UL-MU-MIMO communication is allowed to take place, the AP 110 can collect information from the STAs 120 that can participate in the UL-MU-MIMO communication. The AP 110 can optimize the collection of information from the STAs 120 by scheduling the transmissions from the STAs 120.

In one embodiment, the AP 110 can use a station scheduling frame (SSF) to schedule the transmission of multiple station access information frames (SIFs) from STAs 120. The SSF frame can be a short frame to allow for faster communication to trigger a response from the STAs. The SSF can be a CTX message 402 or another message indicating the STAs 120 send a SIF. In general, station access information can include any information regarding a STA, for example information on how, when, or if the STA should access the AP. For example, the SIF can contain information indicating that the STAs 120 have data, how much data they have, and what type of data (i.e. what access class). It can also include the transmit power that is being used to send that SIF. In one embodiment, the SIF is a null data packet (NDP).

Figure 10:
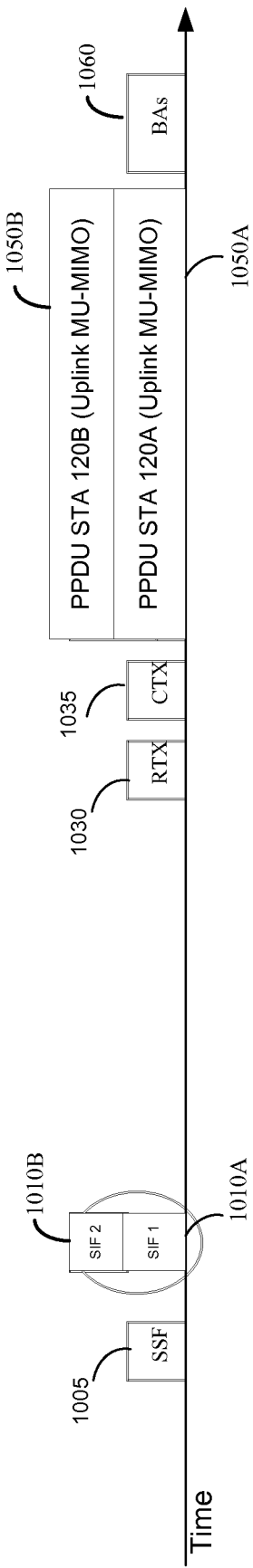
FIG. 10 shows a transmission and reception time diagram of an example of a frame exchange including a station scheduling frame (SSF) and a station access information frame (SIF).

The SIF/SSF exchange can be optimized by using a TDMA, FDMA, SDMA, OFDMA, UL-MU-MIMO, or any other communication system that is based on an orthogonal multiplexing scheme. FIG. 10 is a transmission and reception time diagram illustrating an example of a SSF/SIF exchange in a FDMA system. In this embodiment, the SSF 1005 contains a list of STAs 120 to send SIFs 1010 to the AP 110. The SSF 1005 can also contain power adjustment information to control the power of the FDMA transmission 1010 signals. The SIFs 1010A and 1010B as well as the maximum number of TID information blocks allowed in a SIF 1010 can be pre-negotiated so that the SIF response is always a fixed time duration. Alternatively the amount of time for the SIF 1010 response can be pre-negotiated. The amount of time for the SIF 1010 response can also be included in the SSF 1005. When the response time is known, the STAs 120 would be allowed to send at higher MCSs and therefore send more TIDs. The frequency allocation based on the STA 120 order in the SSF can also be pre-negotiated to determine which STA 120 gets which 20 MHz block for communication.

Figure 11:
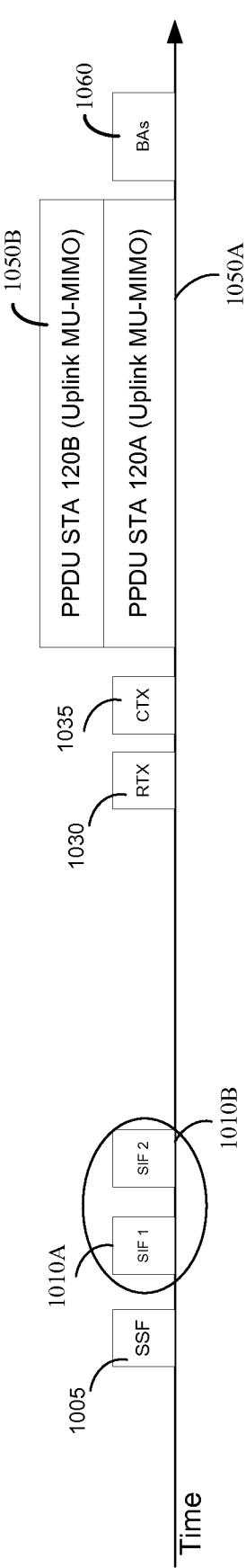
FIG. 11 shows a transmission and reception time diagram of another example of a frame exchange including a station scheduling frame (SSF) and a station access information frame (SIF).

FIG. 11 is a transmission and reception time diagram illustrating an example of a SSF/SIF exchange in a TDMA system. In this embodiment, the SSF 1005 contains a list of STAs 120 to send SIFs 1010 to the AP 110. In this embodiment, SIFs 1010A and 1010B are sent sequentially by the STAs 120*a* and 120B, respectively. The MCS of the SIFs 1010A and 1010B, as well as the maximum number of TIDs allowed in a SIF 1010 can be pre-negotiated to determine the time of each SIF 1010. For example, if a STA 120 has less than the maximum number of TIDs to fill out, the STA 120 can fill the remaining TIDs with padding so that all the SIFs are the same length. Alternatively the amount of time for the SIF 1010 response can be pre-negotiated. The amount of time for the SIF 1010 response can also be included in the SSF 1005. When the response time is known, the STAs 120 would be allowed to send at higher MCSs and therefore send more TID information blocks.

In another embodiment, the SSF/SIF exchange can take place in OFDMA system. In this embodiment, the SSF 1005 contains the total number of STAs 120 being asked to send SIFs 1010 and a list of STAs 120 to send SIFs 1010 to the AP 110. The SSF 1005 can also contain power adjustment information to control the power of the SIF transmission 1010 signals. In this embodiment, the MCS of the SIFs 1010, and number of TID information blocks in the SIF 1010 can be pre-negotiated. Alternatively, the amount of time for the SIF 1010 response can also be included in the SSF 1005 or pre-negotiated. When the response time is known by the STAs 120, the STAs 120 would be allowed to send at higher MCSs and therefore send more TIDs. In one aspect, the mapping of the STAs 120 order to subcarriers can be pre-negotiated and would be a function of the number of STAs 120 being asked to send a SIF 1010.

In another embodiment, the SSF/SIF exchange can take place in a UL-MU-MIMO system. In this embodiment, the SSF 1005 contains a list of STAs 120 to send SIFs 1010 to the AP 110. The SSF 1005 can also contain power adjustment information to control the power of the SIF transmission 1010 signals. In this embodiment, the MCS of the SIFs 1010 can be pre-negotiated. In one aspect, the mapping of the STAs 120 order to spatial streams can be pre-negotiated and would be a function of the number of STAs 120 being asked to send a SIF 1010. Additionally, the maximum number of TIDs allowed in a SIF 1010 and the amount of time for the SIF 1010 response can be pre-negotiated. Alternatively, the amount of time for the SIF 1010 response can also be included in the SIF 1010, or pre-negotiated. When the response time is known by the STAs 120, the STAs 120 would be allowed to send at higher MCSs and therefore send more TIDs.

Figure 12:
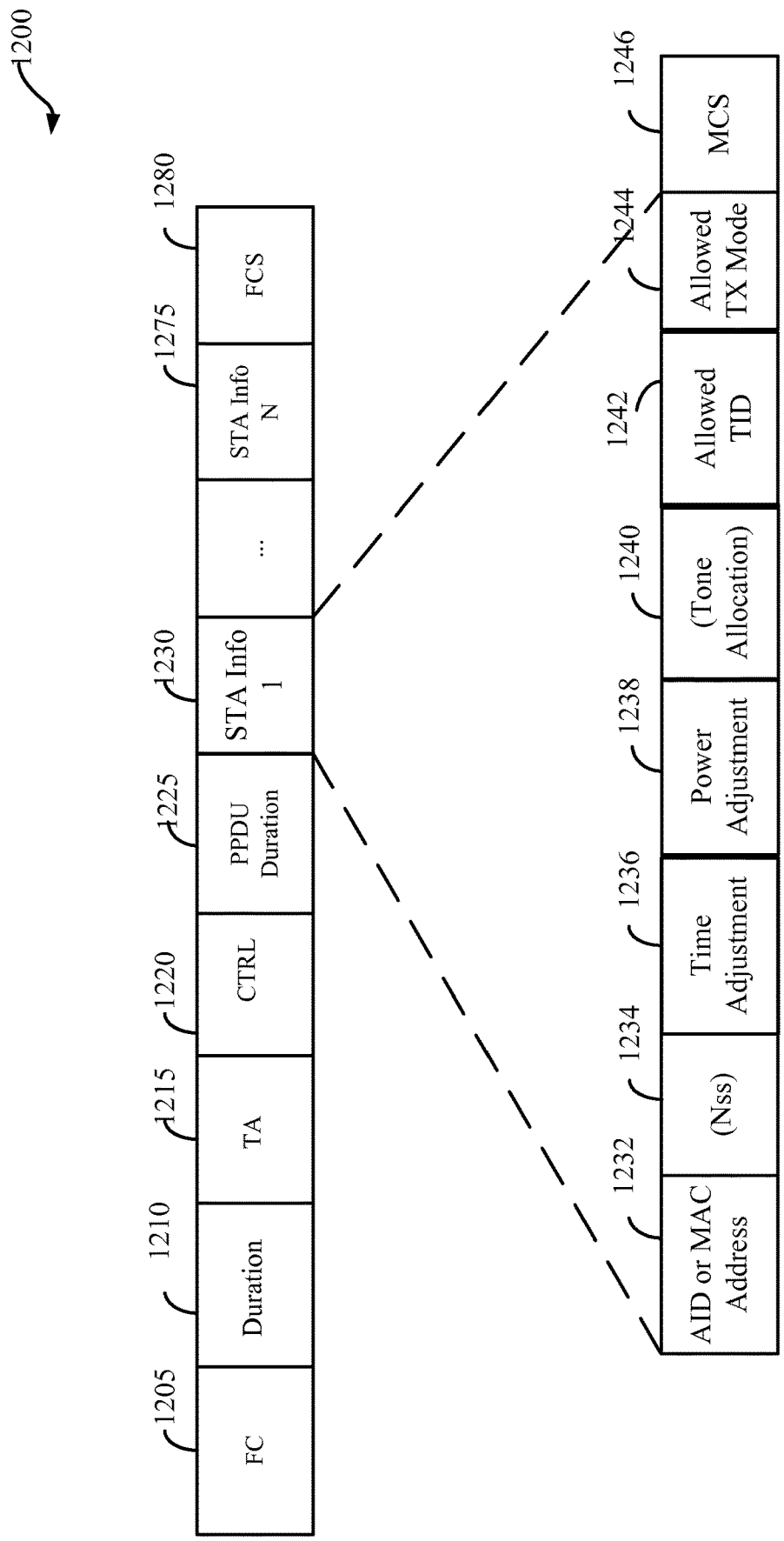
FIG. 12 shows a diagram of one embodiment of a clear to transmit (CTX) frame.

As discussed above, the CTX message 402 can be used in a variety of communications. FIG. 12 is a diagram of an example of a CTX frame 1200 structure. In this embodiment, the CTX frame 1200 is a control frame that includes a frame control (FC) field 1205, a duration field 1210, a transmitter address (TA) field 1215, a control (CTRL) field 1220, a PPDU duration field 1225, a STA info field 1230, and a frame check sequence (FCS) field 1280. The FC field 1205 indicates a control subtype or an extension subtype.

The duration field 1210 indicates to any receiver of the CTX frame 1200 to set the network allocation vector (NAV). The TA field 1215 indicates the transmitter address or a BSSID. The CTRL field 1220 is, in general, a field that can include information regarding the format of the remaining portion of the frame (e.g., the number of STA info fields and the presence or absence of any subfields within a STA info field), indications for rate adaptation for the STAs 120, indication of allowed TID, and indication that a CTS must be sent immediately following the CTX frame 1200. The CTRL field 1220 can also indicate if the CTX frame 1200 is being used for UL MU MIMO or for UL FDMA or both, indicating whether a Nss or Tone allocation field is present in the STA Info field 1230. Alternatively, the indication of whether the CTX is for UL MU MIMO or for UL FDMA can be based on the value of the subtype. Note that UL MU MIMO and UL FDMA operations can be jointly performed by specifying to a STA both the spatial streams to be used and the channel to be used, in which case both fields are present in the CTX; in this case, the Nss indication is referred to a specific tone allocation. The PPDU duration 1225 field indicates the duration of the following UL-MU-MIMO PPDU that the STAs 120 are allowed to send. The STA Info 1230 field contains information regarding a particular STA and can include a per-STA (per STA 120) set of information (see STA Info 1 1230 and STA Info N 1275). The STA Info 1230 field can include an AID or MAC address field 1232 which identifies a STA, a number of spatial streams field (Nss) 1234 field which indicates the number of spatial streams a STA can use (in an UL-MU-MIMO system), a Time Adjustment 1236 field which indicates a time that a STA should adjust its transmission compared to the reception of a trigger frame (the CTX in this case), a Power Adjustment 1238 field which indicates a power backoff a STA should take from a declared transmit power, a Tone Allocation 1240 field which indicates the tones or frequencies a STA can use (in a UL-FDMA system), an Allowed TID 1242 field which indicates the allowable TID, an Allowed TX Mode 1244 field which indicates the allowed TX modes, and a MCS 1246 field which indicates the MCS the STA should use. A STA 120 receiving a CTX with an Allowed TID 1242 indication can be allowed to transmit data only of that TID, data of the same or higher TID, data of the same or lower TID, any data, or only data of that TID first, then if no data is available, data of other TIDs. The FCS 1280 field indicates the carries an FCS value used for error detection of the CTX frame 1200.

Figure 13:
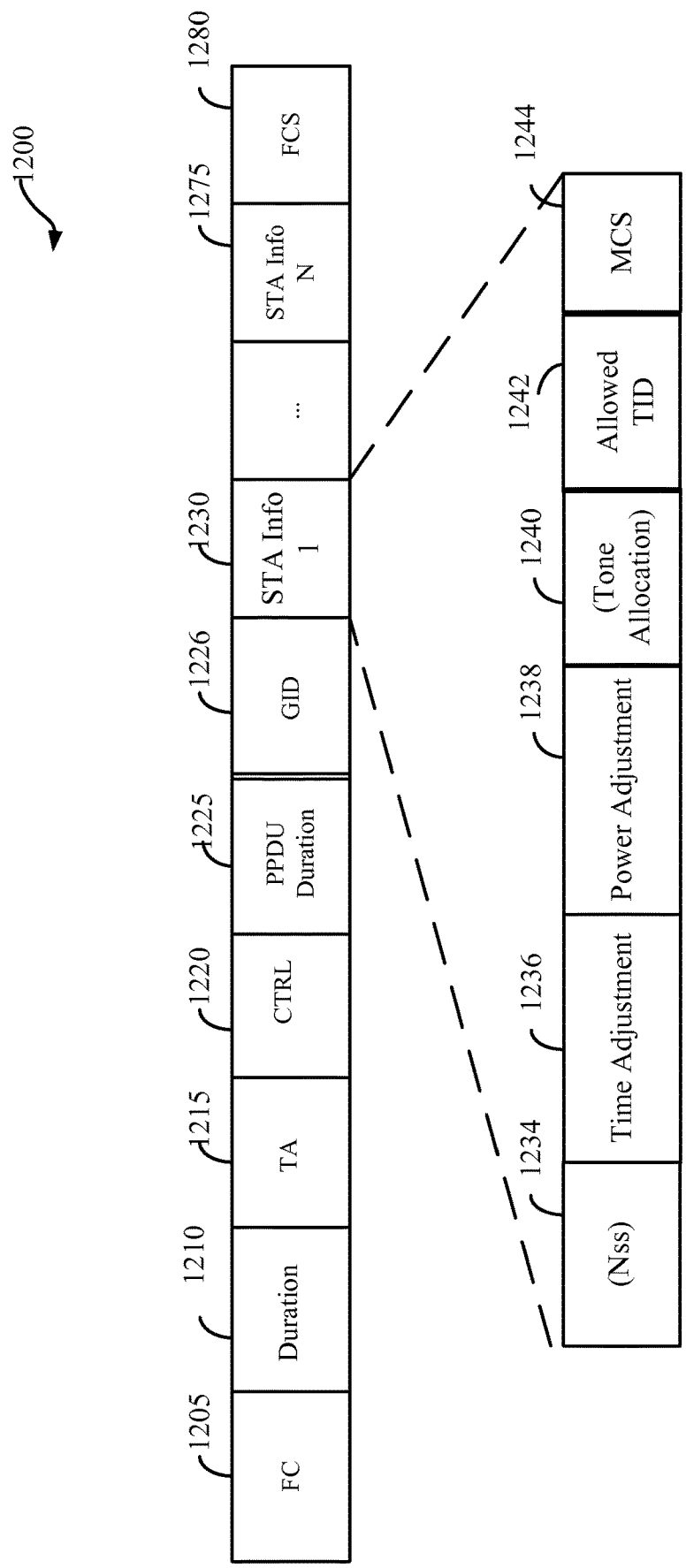
FIG. 13 shows a diagram of another embodiment of a CTX frame.
Figure 14:
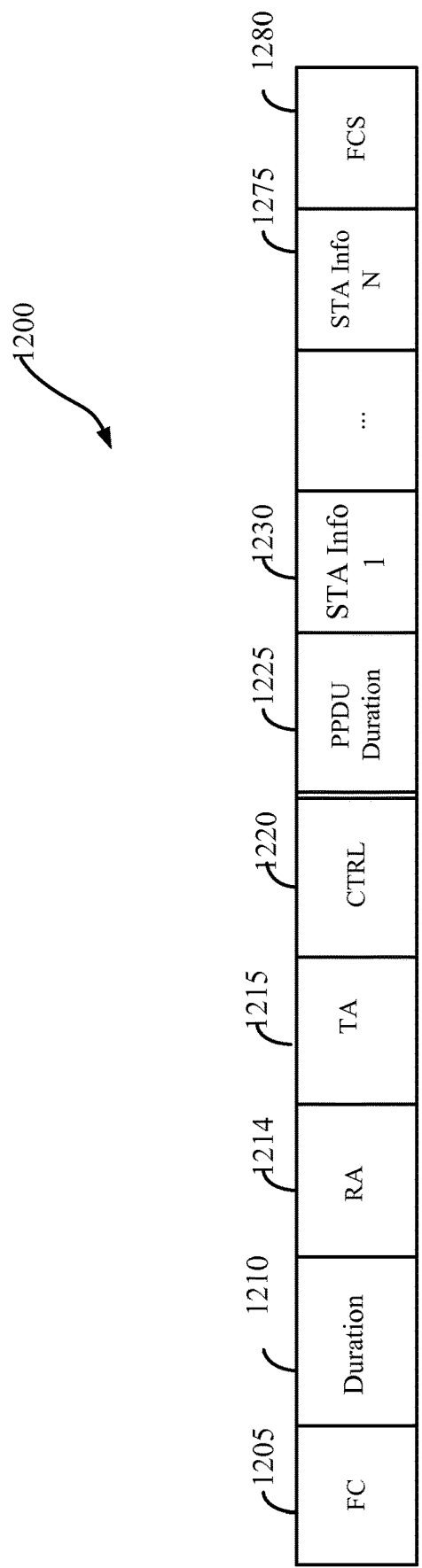
FIG. 14 shows a diagram of another embodiment of a CTX frame.

FIG. 13 is a diagram of another example of a CTX frame 1200 structure. In this embodiment and in conjunction with FIG. 12, the STA Info 1230 field does not contain the AID or MAC Address 1232 field and instead the CTX frame 1200 includes a group identifier (GID) 1226 field which identifies the one or more stations by a group identifier rather than an individual identifier. FIG. 14 is a diagram of another example of a CTX frame 1200 structure. In this embodiment and in conjunction with FIG. 13, the GID 1226 field is replaced with a RA 1214 field which identifies a group of STAs through a multicast MAC address.

Figure 15:
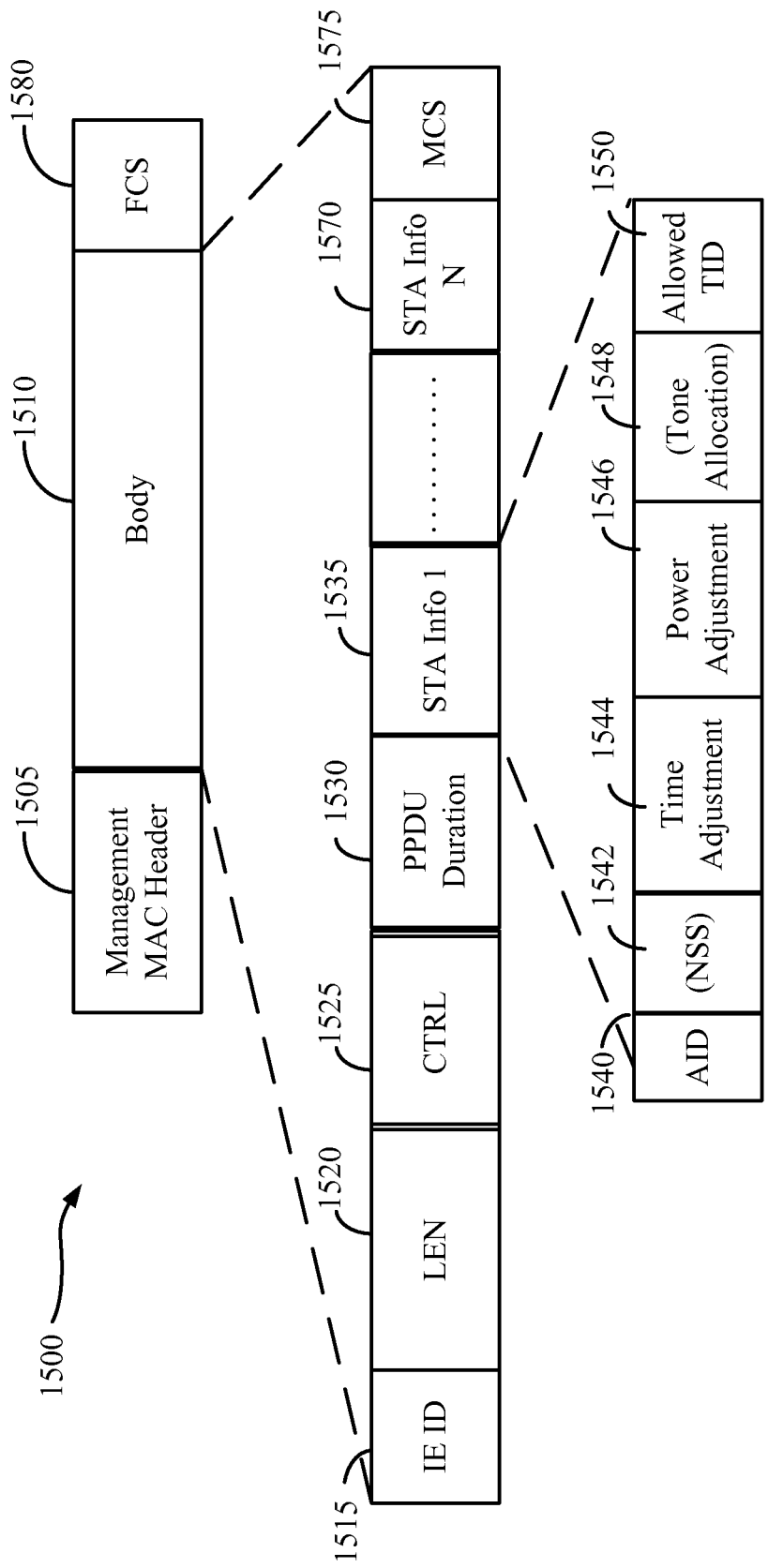
FIG. 15 shows a diagram of another embodiment of a CTX frame.

FIG. 15 is a diagram of an example of a CTX 1500 frame structure. In this embodiment, the CTX 1500 frame is a management frame that includes a Management MAC Header 1505 field, a Body 1510 field, and a FCS 1580 field. The Body 1510 field includes an IE ID 1515 field which identifies an information element (IE), a LEN 1520 field which indicates the length of the CTX 1500 frame, a CTRL 1525 field which includes the same information as the CTRL 1220 field, a PPDU Duration 1530 field which indicates the duration of the following UL-MU-MIMO PPDU that the STAs 120 are allowed to send., a STA Info 1 1535 field and a MCS 1575 field which can indicate the MCS for all the STAs to use in the following UL-MU-MIMO transmission, or an MCS backoff for all the STAs to use in the following UL-MU-MIMO transmission. The STA Info 1 1535 (along with STA Info N 1570) field represent a per STA field that includes AID 1540 field which identifies a STA, a number of spatial streams field (Nss) 1542 field which indicates the number of spatial streams a STA can use (in an UL-MU-MIMO system), a Time Adjustment 1544 field which indicates a time that a STA should adjust its transmission compared to the reception of a trigger frame (the CTX in this case), a Power Adjustment 1546 field which indicates a power backoff a STA should take from a declared transmit power, a Tone Allocation 1548 field which indicates the tones or frequencies a STA can use (in a UL-FDMA system), and an Allowed TID 1550 field which indicates the allowable TID.

In one embodiment, the CTX frame 1200 or the CTX 1500 frame can be aggregated in an A-MPDU to provide time to a STA 120 for processing before transmitting the UL signals. In this embodiment, padding or data can be added after the CTX to allow a STA 120 additional time to process the forthcoming packet. One benefit to padding a CTX frame can be to avoid possible contention issues for the UL signals from other STAs 120. In one aspect, if the CTX is a management frame, additional padding IEs can be sent. In another aspect the STAs 120 can request to the AP 110 a minimum duration or padding for the CTX frame.

In some embodiments, the AP 110 can initiate a CTX transmission. In one embodiment, the AP 110 can send a CTX message 402 in accordance with regular enhanced distribution channel access (EDCA) contention protocol. In another embodiment, the AP 110 can send a CTX message 402 at scheduled times. In this embodiment, the scheduled times can be indicated by the AP 110 to the STAs 120 by using a restricted access window (RAW) indication in a beacon which indicates a time reserved for a group of STAs 120 to access the medium, a target wake time (TWT) agreement with each STA 120 which indicates to multiple STAs 120 to be awake at the same time to take part in a UL-MU-MIMO transmission, or information in other fields. Outside the RAW and TWT a STA 102 can be allowed to transmit any frame, or only a subset of frames (e.g., non-data frames). It can also be forbidden to transmit certain frames (e.g., it can be forbidden to transmit data frames). The STA 120 can also indicate that it is in sleep state. One advantage to scheduling a CTX is that multiple STAs 120 can be indicated for the same TWT or RAW time and can receive a transmission from the AP 110.

Figure 16:
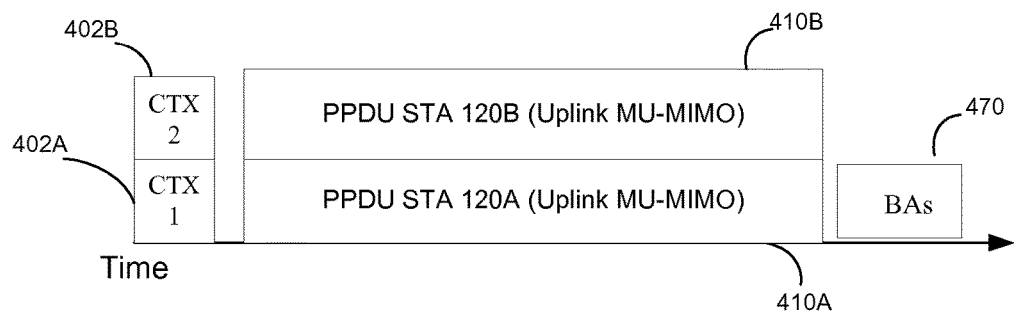
FIG. 16 shows a transmission and reception time diagram of another example of a frame exchange of an UL-MU-MIMO communication.
Figure 17:
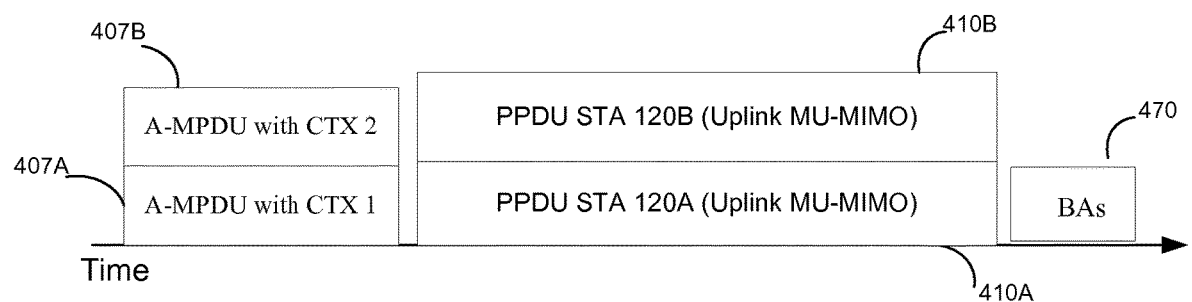
FIG. 17 shows another example of a frame exchange of an UL-MU-MIMO communication.

In one embodiment, a CTX message 402 can include information for a single STA 120. In this embodiment, the AP 110 can send multiple CTX messages 402 that include information for one STA 120 at the same time to multiple STAs 120, creating a schedule for the following UL-MU-MIMO transmission 410. FIG. 16 is a transmission and reception time diagram illustrating an example of sending multiple CTX messages 402A and 402B at the same time. As shown, the CTX messages 402A and 402B can be sent simultaneously using DL-MU-MIMO or DL-FDMA transmissions to one station each (STA 120a and 120B, respectively). The STAs 120a and 120B receive the CTX messages 402A and 402B and then begin the UL-MU-MIMO (or UL-FDMA) transmissions 410A and 410B. FIG. 17 is a transmission and reception time diagram and illustrates an example of sending the CTX messages within A-MPDU messages 407A and 407B. As in FIG. 16, the CTX portion of the A-MPDU messages 407A and 407B contain information for one STA (STA 120a and 120B, respectively) and the STAs 120a and 120B receive the messages 407A and 407B and begin the UL-MU-MIMO (or UL-FDMA) transmissions 410A and 410B.

In other embodiments, a STA 120 may not start an UL transmission after receiving a CTX message 402. In one embodiment the AP 110 defines a new frame that triggers a UL transmission. The new frame can be any frame indicated by the AP 110 and can comprise a NDP frame. In this embodiment, the new frame can include a sequence or token number that links the frame to the CTX so that the STA knows that the frame is the same trigger frame as indicated in the CTX and can begin an UL transmission. The frame can also include a duration so that other STAs 120 hearing the transmission can set their NAV. The STA 120 can acknowledge receipt of the CTX by sending an ACK or similar frame. In another embodiment a STA 120 can request the use of a trigger frame. The request can indicate that the trigger be immediate or delayed. One benefit of having a separate trigger frame can be that the trigger frame can give a STA more time to process the CTX before an UL transmission. Another benefit can be that the trigger frame can be a shorter frame than the CTX and can be sent at multiple times without subsequent CTX messages to allow for faster UL time. The trigger frame could follow the CTX immediately, or at a pre-specified offset or set of offsets from the CTX.

Figure 18:
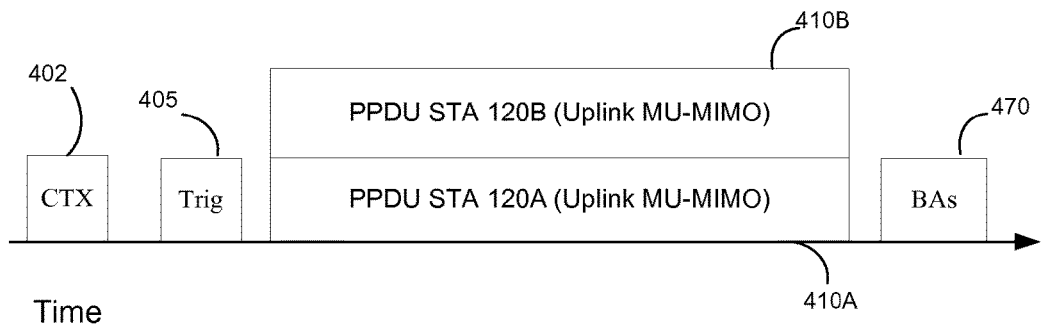
FIG. 18 shows an example of a frame exchange including a trigger frame.
Figure 19:
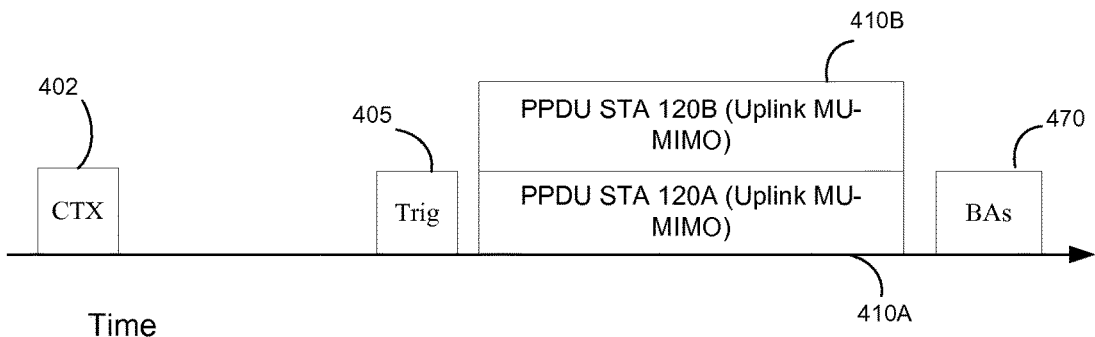
FIG. 19 shows another example of a frame exchange including a trigger frame.
Figure 20:
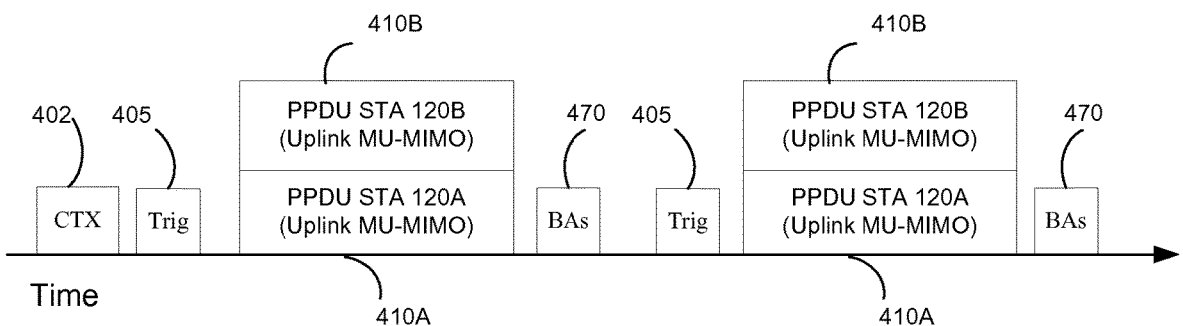
FIG. 20 shows another example of a frame exchange including a trigger frame.

FIG. 18 is a transmission and reception time diagram that illustrates one embodiment of a CTX/Trigger exchange. In this embodiment, the AP 110 sends a CTX message 402 to the STAs 120 and then later sends the trigger frame 405. Once the STAs 120a and 120B receive the trigger frame 405, they begin the UL-MU-MIMO transmissions 410A and 410B. FIG. 19 is a transmission and reception time diagram that illustrates an example where the time between the CTX message 402 and the trigger frame 405 is greater than that shown in FIG. 18. FIG. 20 is a transmission and reception time diagram that illustrates an example of sending multiple trigger frames 405 over time to initiate multiple UL-MU-MIMO 410 transmissions. In this embodiment, the second trigger frame 405 does not need to be preceded by the CTX 402 to initiate the second UL-MU-MIMO transmissions 410A and 410B because the STAs 120a and 120B can just confirm the trigger frame has the same sequence or token number as indicated in the CTX and begin transmission.

In some embodiments, if the AP 110 cannot multiplex ACKs or BAs to STAs 120 (i.e. the AP 110 is not using any DL-MU-MIMO or DL-FDMA to send ACKs to multiple STAs at the same time), then only one STA 120 can be allowed to set the BA policy to an immediate BA or a normal ACK and the AP 110 can be allowed to indicate which STA 120 in the CTX list can set the BA policy. The indication can be based on the position of the STA info field for that STA 120 in the CTX, such as the first position.

In another embodiment, if the AP 110 can multiplex ACKs or BAs to STAs 120, then more than one STA 120 can set the BA policy to immediate BA or normal ACK. In this embodiment, the AP 110 will use DL-MU-MIMO or DL-FDMA to send immediate ACKs to the multiple STAs 120 that indicated immediate BA or normal ACK at the same time. In a different embodiment, if a STA sets the BA policy to Delayed BA, then the AP 110 can send the BAs in a time sequence to the STAs 120. The time sequence can be separated by SIFS. In another embodiment, if a STA 120 sets the BA policy to BA, the AP 110 will wait for a poll from each STA 120 before sending a BA. In another embodiment, a broadcast BA frame can be defined, which includes block acknowledgments for multiple STAs 120. In case such a frame is used, multiple STAs 120 are allowed to set the ACK policy to immediate BA; the STAs 120 that set the ACK policy to immediate BA are acknowledged by the inclusion of the corresponding block acknowledgment in the broadcast BA frame sent immediately after the UL transmissions. The broadcast BA can also be used to acknowledge multiple STAs 120 that set a delayed BA policy; in this case the broadcast BA frame is sent with contention at a later time.

As discussed above, for example with respect to FIG. 17, in various embodiments, control information and/or trigger information can be encapsulated in an A-MPDU. For example, in FIG. 17 the A-MPDU 407 includes CTX scheduling, control, and/or trigger information as described above with respect to FIGS. 4-20. Similarly, in various embodiments, such scheduling, control, and/or trigger information can be included in an aggregated PPDU (A-PPDU) instead of, or in addition to a CTX. In other words, in some embodiments, one or more fields or indicators discussed above with respect to the CTX can be included in an A-PPDU, which can replace the CTX in one or more of the time sequence diagrams shown in FIGS. 4-20.

Figures 21, 22:
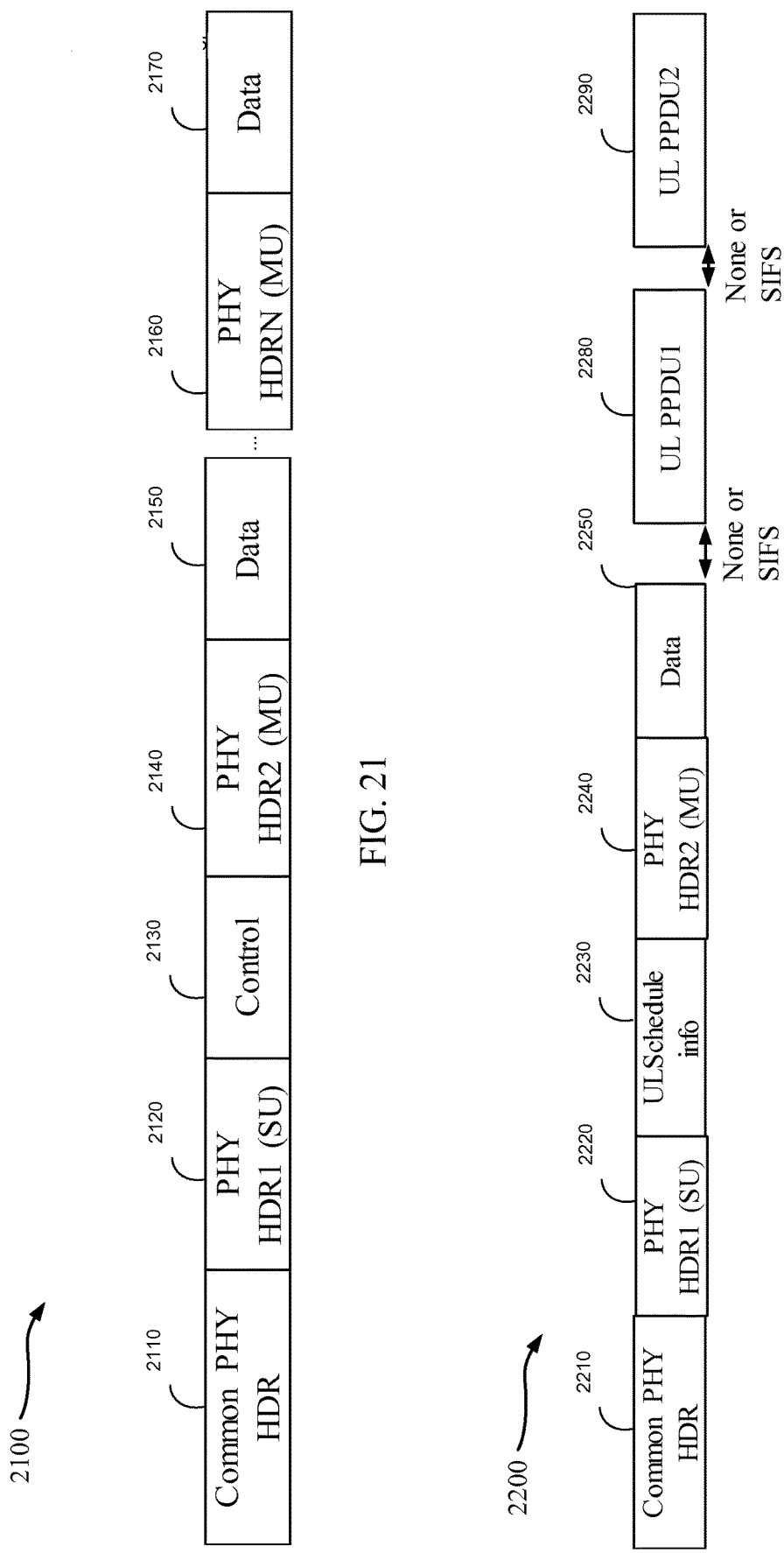
FIG. 21 is a diagram that illustrates one embodiment of an aggregated PPDU (A-PPDU).
FIG. 22 is a transmission and reception time diagram that illustrates one embodiment of an A-PPDU trigger exchange.

FIG. 21 is a diagram that illustrates one embodiment of an aggregated PPDU (A-PPDU) 2100. As shown in FIG. 21, the A-PPDU 2100 includes a common PHY header 2110, one or more per-PPDU headers 2120, 2140, and 2160, and one or more per-PPDU payloads 2130, 2150, and 2170. Although the illustrated A-PPDU 2100 includes an SU PPDU header 2120 and payload 2130, and N−1 MU PPDU headers and payloads 2150-2170, a person having ordinary skill in the art will appreciate that the illustrated A-PPDU 2100 can include additional fields, fields can be rearranged, removed, and/or resized, and the contents of the fields varied. For example, in various embodiments, the SU PPDU header 2120 and payload 2130 can be in a different location, there can be more than one SU PPDU, there can be any number of MU PPDUs, etc.

The common PHY header 2110 serves to provide PHY layer information common to each PPDU in the A-PPDU 2100, such as acquisition and/or synchronization information. In various embodiments, the common PHY header 2110 can indicate (for example, via one or more bits or flags) whether the A-PPDU 2100 includes at least one PPDU with broadcast/multicast information that all STAs are instructed to decode. In an embodiment, when the indication is set, one or more STAs 120 can be configured to decode subsequent PPDUs in order to obtain the broadcast/multicast information (for example, in the SU payload 2130).

The SU PHY header 2120 serves to provide PHY layer information specific to the SU payload 2130. In various embodiments, the SU PHY header 2120 can indicate (for example, via one or more bits or flags) whether the A-PPDU 2100 includes at least one PPDU with broadcast/multicast information that all STAs are instructed to decode. In an embodiments, when the indication is set, one or more STAs 120 can be configured to decode subsequent PPDUs in order to obtain the broadcast/multicast information (for example, in the SU payload 2130).

In the illustrated embodiment, the SU payload 2130 includes control information, for example broadcast data, multicast data, control information, and/or management information that can be decoded by both SU and MU STAs. In various embodiments, the SU PHY header 2120 and the SU payload 2130 can be broadcast or unicast. In various embodiments, the SU PHY header 2120 and the SU payload 2130 can be in a position other than first in the A-PPDU 2100.

The MU PHY header 2140 serves to provide PHY layer information specific to the MU payload 2150. In various embodiments, the MU PHY header 2140 can indicate (for example, via one or more bits or flags) whether the A-PPDU 2100 includes at least one PPDU with broadcast/multicast information that all STAs are instructed to decode. In an embodiments, when the indication is set, one or more STAs 120 can be configured to decode subsequent PPDUs in order to obtain the broadcast/multicast information (for example, in the SU payload 2130).

As shown, the A-PPDU 2100 can include a total of N PPDUs. In various embodiments, the PHY header 2160 can be similar to one of the SU PHY header 2120 and the MU PHY header 2140. In various embodiments, the payload 2170 can be similar to one of the SU payload 2130 and the MU payload 2150. In various embodiments, the MU PPDUs can be omitted entirely.

In various embodiments, the A-PPDU 2100 of FIG. 21 can be used in conjunction with an UL MU MIMO/OFDMA protocol, such as for example 802.11ax. For example, the A-PPDU 2100 can include scheduling and/or trigger information discussed above with respect to the CTX and exchanges of FIGS. 4-20. Thus, in various embodiments, the AP 110 can transmit the A-PPDU 2100 to schedule UL PPDUs from one or more STAs 120. In various embodiments, such exchange can be referred to herein as an A-PPDU trigger exchange.

FIG. 22 is a transmission and reception time diagram that illustrates one embodiment of an A-PPDU 2200 trigger exchange. As shown in FIG. 22, the A-PPDU 2200 includes a common PHY header 2210, one or more per-PPDU headers 2220 and 2240, one or more per-PPDU payloads 2230 and 2250. The exchange further includes an one or more scheduled UL PPDUs 2280 and 2290. Although the illustrated A-PPDU 2200 trigger exchange includes one SU PPDU header 2220 and payload 2230, and one MU PPDU header 2240 and payload 2250, a person having ordinary skill in the art will appreciate that the illustrated A-PPDU 2200 trigger exchange can include additional fields, fields can be rearranged, removed, and/or resized, and the contents of the fields varied. For example, in various embodiments, the SU PPDU header 2220 and payload 2230 can be in a different location, there can be more than one SU PPDU, there can be any number of MU PPDUs, a different number of scheduled UL PPDUs, etc.

The common PHY header 2210 serves to provide PHY layer information common to each PPDU in the A-PPDU 2200, such as acquisition and/or synchronization information. In various embodiments, the common PHY header can indicate (for example, via one or more bits or flags) whether the A-PPDU 2200 includes at least one PPDU with broadcast/multicast information that all STAs are instructed to decode. In an embodiments, when the indication is set, one or more STAs 120 can be configured to decode subsequent PPDUs in order to obtain the broadcast/multicast information (for example, in the SU payload 2230).

The SU PHY header 2220 serves to provide PHY layer information specific to the SU payload 2230. In various embodiments, the SU PHY header 2220 can indicate (for example, via one or more bits or flags) whether the A-PPDU 2200 includes at least one PPDU with broadcast/multicast information that all STAs are instructed to decode. In an embodiments, when the indication is set, one or more STAs 120 can be configured to decode subsequent PPDUs in order to obtain the broadcast/multicast information (for example, in the SU payload 2230).

In the illustrated embodiment, the SU payload 2230 includes UL scheduling information 2230 for scheduling one or more UL PPDUs such as the UL PPDUs 2280 and 2290. In various embodiments, the UL scheduling information 2230 can include one or more fields or indicators discussed above with respect to one or more of: the CTX 402, 1035, 1200, and 1500, the CTS 408, the SSF 1005, the A-MPDU 407, the BAs 470, and the trigger frame 405, variously discussed above with respect to FIGS. 5-20. For example, in various embodiments, the UL scheduling information 2230 can include one or more of: identification of the STAs permitted or instructed to transmit one or more UL PPDUs, identification of resources allocated to STAs such as spatial streams, tones, etc., scheduling times and/or durations of UL transmissions, type and or content of scheduled UL transmissions, etc. In various embodiments, information included in the UL scheduling information 2230 can be omitted from the common PHY header 2210. In various embodiments, the SU PHY header 2220 and the SU payload 2230 can be broadcast or unicast. In various embodiments, the SU PHY header 2220 and the SU payload 2230 can be in a position other than first in the A-PPDU 2200.

The MU PHY header 2240 serves to provide PHY layer information specific to the MU payload 2250. In various embodiments, the MU PHY header 2240 can indicate (for example, via one or more bits or flags) whether the A-PPDU 2200 includes at least one PPDU with broadcast/multicast information that all STAs are instructed to decode. In an embodiments, when the indication is set, one or more STAs 120 can be configured to decode subsequent PPDUs in order to obtain the broadcast/multicast information (for example, in the SU payload 2230).

In an embodiment, the AP 110 can transmit the A-PPDU 2200, with UL scheduling information 2230, to one or more STAs 120. The STAs 120 can decode the UL scheduling information and can determine a time that they are instructed to transmit an UL PPDU. In various embodiments, UL PPDUs can be spaced according to a short interframe space (SIFS), can be spaced according to another spacing, or can be un-spaced. In the illustrated embodiment, the STAs 120 transmit the UL PPDU1 2280 and the UL PPDU2 2290 according to the UL scheduling information 2230.

FIGS. 23A-23D show time sequence diagrams 2300A-2300D that illustrate various embodiments of A-PPDU trigger exchanges. A person having ordinary skill in the art will appreciate that the illustrated A-PPDU trigger exchanges can include additional transmissions and/or fields, transmissions and/or fields can be rearranged, removed, and/or resized, and the contents of the transmissions and/or fields varied. For example, in various embodiments, the A-PPDU trigger exchange can optionally include a CTS 2310, which can precede an A-PPDU 2320A in embodiments where the A-PPDU 2320A is not legacy compatible. The CTS 2310 can set the NAV to protect the A-PPDU trigger exchange. In various embodiments, the A-PPDU trigger exchange can include another frame protecting the exchange, in addition to, or instead of, the CTS 2310.

As shown in FIG. 23A, the AP 110 can transmit the A-PPDU 2320A, including trigger information and one or more DL MU PPDUs, to one or more STAs 120. The STAs 120 can receive the DL MU PPDUs and can transmit one or more BAs 2330 based at least in part on the trigger information of the A-PPDU 2320A.

As shown in FIG. 23B, the AP 110 can transmit the A-PPDU 2320B, including trigger information and one or more DL MU PPDUs, to one or more STAs 120. The STAs 120 can receive the DL MU PPDUs and can transmit one or more BAs 2330 based at least in part on the trigger information of the A-PPDU 2320B. The STAs 120 can further transmit one or more MU-PPDUs 2340 based at least in part on the trigger information of the A-PPDU 2320B.

As shown in FIG. 23C, the AP 110 can transmit the A-PPDU 2320C, including trigger information, to one or more STAs 120. The STAs 120 can receive the DL MU PPDUs and can transmit one or more MU-PPDUs 2340 based at least in part on the trigger information of the A-PPDU 2320C. The AP 110 can transmit a A-PPDU 2350, including trigger information and BAs for the MU-PPDUs 2340, to one or more STAs 120. The STAs 120 can receive the BAs and can transmit one or more additional MU-PPDUs 2340 based at least in part on the trigger information of the A-PPDU 2350.

As shown in FIG. 23D, the AP 110 can transmit the A-PPDU 2320D, including trigger information and one or more DL MU PPDUs, to one or more STAs 120. The STAs 120 can receive the DL MU PPDUs and can transmit one or more BAs 2330 based at least in part on the trigger information of the A-PPDU 2320D. The STAs 120 can further transmit information about traffic ability to the AP 110 based at least in part on the trigger information of the A-PPDU 2320D. For example, in various embodiments traffic information can include one or more SIFs, such as the SIFs 1010 discussed above with respect to FIGS. 10-11.

Wildcard Resource Allocation

As discussed herein, various trigger frames can be used to schedule UL data transmissions. In various embodiments, such trigger frames can include one or more fields or indicators discussed above with respect to one or more of: the CTX 402, 1035, 1200, and 1500, the CTS 408, the SSF 1005, the A-MPDU 407, the BAs 470, the trigger frame 405, and the UL scheduling information 2230, variously discussed above with respect to FIGS. 5-22. For example, in various embodiments, the trigger frame can include one or more of: identification of the STAs permitted or instructed to transmit one or more UL PPDUs, identification of resources allocated to STAs such as spatial streams, tones, etc., scheduling or reference times and/or durations of UL transmissions, type and or content of scheduled UL transmissions, etc.

In some embodiments, trigger frames can include a list of resource assignments, each between one STA 120 and one or more allocable resources of a first set of resources. Allocable resources can include, for example, spatial streams, tones, time slots, frequencies, and/or any other physical or logical channels such as sub-channels in a FDMA or OFDMA transmission or streams in a UL MU MIMO transmission. Because allocable resources from the first set of resources are each allocated to a single STA120, the first set of resources can be referred to herein as reserved resources.

Additionally or alternatively, trigger frames can include a list of resource assignments, each between a plurality of STAs 120a-120hi and one or more allocable resources of a second set of resources. In some embodiments, trigger frames can include a list of resource assignments, each between a single allocable resource of the second set of resources and a plurality of STAs 120a-120hi. Again, allocable resources can include, for example, spatial streams, tones, time slots, frequencies, and/or any other physical or logical channels such as sub-channels in a FDMA or OFDMA transmission or streams in a UL MU MIMO transmission. Because allocable resources from the second set of resources are each allocated to a plurality of STAs 120, the second set of resources can be referred to herein as wildcard resources.

Thus, the plurality of STAs 120a-120hi assigned to each wildcard resource share that wildcard resource. For example, the STAs 120a-120hi can contend for the wildcard resource or resources to which they are assigned. In particular, the STAs 120a-120hi can contend using a "random contention resolution" mechanism, for example, random access, carrier sense multiple access (CSMA), clear channel assessment (CCA), or similar contention resolution methods.

In various embodiments, the set of reserved resources and the set of wildcard resources can be disjoint. In other words, in some embodiments, no resources are in both the set of reserved resources and the set of wildcard resources. In other embodiments, the set of reserved resources and the set of wildcard resources can overlap. In other words, at least one resources is in both the set of reserved resources and the set of wildcard resources.

For wildcard resources, the multiple STAs 120a-120hi mapped to each wildcard resource can be all or a subset of the STAs 120a-120hi of the same BSS, enabled for UL MU MIMO or OFDMA. In some embodiments, the subset of the STAs 120a-120hi of the same BSS can exclude STAs 120a-120hi to which reserved resources have already been allocated. In some embodiments, the subset of the STAs 120a-120hi can be identified by one or more of: a prior indication from the AP 110 enabling certain STAs 120a-120hi to use the wildcard resources, a group identifier indicated in the trigger frame and associated with one or more wildcard resources which can be negotiated with the AP 110, a portion of a MAC or AID address of the assigned STAs which can be indicated in the trigger frame and associated with one or more wildcard resources, and groups or other criteria defined as a function of a time synchronization function (TSF), for example by allowing a set A of STAs to use the wildcard resource at a first time and allowing a set B of STAs to use the wildcard resource at a second time.

In some embodiments, transmissions on wildcard resources can be limited by the type of traffic to be sent on that resource. For example, the trigger frame can indicate that only STAs sending data of a specified TID are allowed (or disallowed) to use the assigned wildcard resource. As another example, the trigger frame can indicate that only STAs sending frames of a specified type are allowed (or disallowed) to use the assigned wildcard resource. In various embodiments, the specified allowed (or disallowed) frame types can include, for example, one or more of: probe requests, association requests, queue feedback (e.g., QoS null frames), etc. Allowing or disallowing specified frame types from using wildcard resources can advantageously allow the AP 110 to provide access to STAs when the AP does not have an indication that the STA has data to send (for example, unassociated STAs 120a-120hi).

Wildcard Resource Access

As discussed above, a collision resolution mechanism can be used to reduce collisions on the wildcard resources. For example, STAs 120a-120hi that have data to transmit on a wildcard resource can prune their transmissions (for example randomly or pseudo-randomly), such that the probability that only one STA transmits is above a threshold. As another example, the AP 110 can limit the number of STAs 120a-120hi contending for a given wildcard resource by excluding STAs 120a-120hi and transmission types such that the probability that only one STA transmits is above a threshold.

In some embodiments, the trigger frame can include power control, synchronization, and/or duration indications for access to the wildcard resources. In some embodiments, wildcard resources can be used only for UL OFDMA transmissions. In other embodiments, wildcard resources can be used for both UL OFDMA and UL MU MIMO transmissions. In general, OFDMA transmissions are more robust to power control and cross-interference than UL MU MIMO transmissions.

In some embodiments, transmission on the wildcard resource can be required to be time and frequency synchronized. and power controlled, both among the wildcard transmissions and among the non-wildcard transmissions. Time and frequency synchronization can be obtained, for example, from the reception of the trigger frame. Power control indication can be provided, for example, by the trigger frame.

In some embodiments, the AP 110 may not know which STA will access a wildcard resource, hence the power control indication CTX may not be possible for the wildcard transmissions. In such cases, the AP may perform power control with the potential transmitter STAs 106 in a separate messaging before the trigger frame.

Wildcard Resource Pruning

In one embodiment, the trigger frame can indicate an election parameter that can be used by STAs to determine how to access, or defer from accessing, wildcard resources. In some embodiments, a single election parameter can be used for all wildcard resources. In some embodiments, multiple election parameters can be used on a per-resource basis, or for sets of one or more resources.

The election parameter can indicate, for example, a value p, that can indicate a threshold for access or deferral for the respective wildcard resource. For example, each STA 120 that wishes to access a wildcard resource can generate a random or pseudorandom number within a range of possible p values. If the generated number is less than the value p, then the STA 120 can transmit on the associated wildcard resource. On the other hand, if the generated number is greater than or equal to the value p, the STA 120 does not transmit on the wildcard resource in response to the trigger frame, for example at least until the next trigger frame is received allocating another resource to the STA 120. In various embodiments, STAs 120a-120hi can transmit only when the generated number is greater than p.

The AP 110 can tune the value p, based on the number of STAs 120a-120hi assigned to a wildcard resource. For example, the AP 110 can increase the value p when there are relatively fewer STAs 120a-120hi assigned to a wildcard resource, and can decrease the value p when there are relatively more STAs 120a-120hi assigned to a wildcard resource. In some embodiments, the AP 110 can tune the value p based on observed collisions. For example, when collisions are observed for a particular wildcard resource, the value p associated with that resource can be decreased, thereby reducing the probability of collision.

In some embodiments, STAs 120a-120hi can identify each resource allocation (e.g., from a trigger frame) as a "slot." Thus, the first trigger frame can be identified as a first slot, the second trigger frame can be identified as a second slot, and so on. In an embodiment, the STAs 120a-120hi can perform a backoff procedure based on the identified slots. For example, each STA 120 contending for a particular wildcard resource can initialize a backoff counter to a default, preset, random, or pseudorandom value. During each slot, each STA 120 can observe the wireless medium and can decrement its backoff counter when the wildcard resource appears to be idle.

Each STA 120 can refrain from using the wildcard resource while its backoff counter is greater than zero (or another threshold value). When a STA 120 decrements its backoff counter to zero (or the threshold value), the STA can transmit on the wildcard resource. In the event of collision on a wildcard resource, the initial backoff counter value, or backoff window, can be increased.

In some embodiments, different groups of STAs can be assigned different priorities. For example, one or more STAs can be identified as high-priority STAs (for example, those transmitting time-sensitive data such as real time voice or audio). In some embodiments, high-priority STAs can initialize their backoff counter lower than low-priority STAs. In some embodiments, high-priority STAs can adjust the value p by an offset based on their priority (for example, a high-priority STA could add 1 to the value p to make it more likely to transmit during a given slot).

In some embodiments, STAs 120a-120hi assigned to a wildcard resource can perform a CCA during a legacy preamble period after the trigger message and preceding the UL MU PPDU. For the wildcard resource, the STAs 120a-120hi can omit a physical layer (PHY) header, and perform the CCA during the period in which the legacy preamble would otherwise be transmitted. An example CCA procedure is illustrated in FIG. 24.

Figure 24:
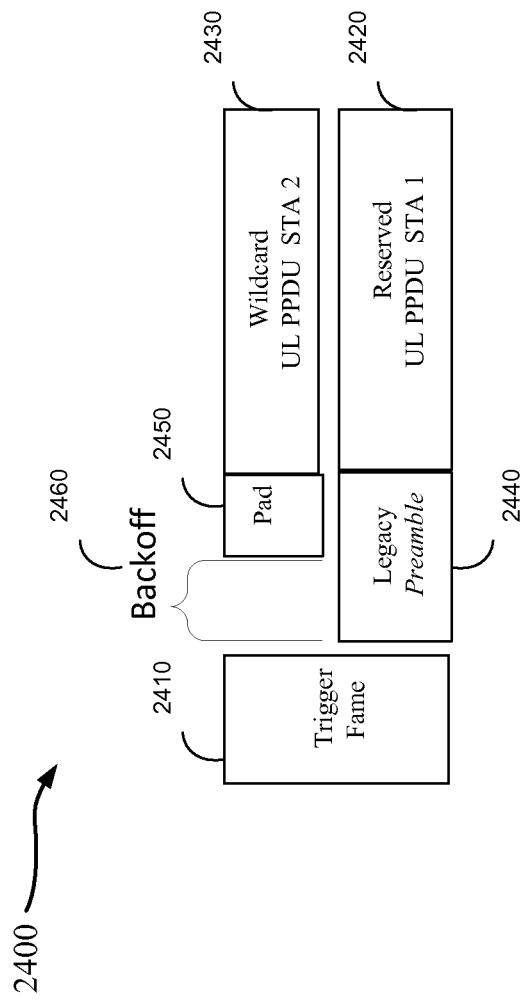
FIG. 24 shows a time sequence diagram that illustrates another embodiment of a trigger exchange.

FIG. 24 shows a time sequence diagram 2400 that illustrates another embodiment of a trigger exchange. A person having ordinary skill in the art will appreciate that the illustrated trigger exchange can include additional transmissions and/or fields, transmissions and/or fields can be rearranged, removed, and/or resized, and the contents of the transmissions and/or fields varied. For example, in various embodiments, the trigger exchange can optionally include an A-PPDU instead of a PPDU.

As shown in FIG. 24, the AP 110 can transmit the trigger frame 2410, including trigger information to one or more STAs 120a-120hi. The trigger frame 2410 can allocate reserved resources for the PPDU 2420 to a single STA 120, and wildcard resources for the PPDU 2430 to a plurality of STAs 120a-120hi. The reserved PPDU 2420 can include a legacy preamble 2440, decodable by legacy devices. The wildcard PPDU 2430 can omit the legacy preamble 2440. Although the illustrated wildcard PPDU 2430 omits the legacy preamble 2440, the wildcard PPDU 2430 can be aligned with the reserved PPDU 2420.

The STAs 120a-120hi can receive the trigger frame 2410. STAs 120a-120hi allocated wildcard resources for the PPDU 2430 can perform a CCA procedure during a backoff period 2460 during the legacy preamble 2440 time. For example, each STA 120 allocated the wildcard resources for the PPDU 2430 can sense the wireless medium for a different length of time. In various embodiments, listening time can be random or pseudorandom. The CCA procedure can mirror the slot backoff discussed above, using smaller discrete time units instead of slots.

Thus, a STA 120 can wait until a preset or randomly generating listening time has elapsed. If the STA 120 has not sensed a transmission using the wildcard resources when its listening time has elapsed, it can transmit the padding signal 2450 until the time of the legacy preamble 2440 ends. The padding 2450 is used to keep the medium busy and prevent access from other STAs 106, according to CSMA. The STA 120 can then transmit the wildcard PPDU 2430. If the STA 120 detects transmission of the padding signal 2450 on the wildcard resources (by another STA) before its listening time has elapsed, the STA 120 can defer to the other STA.

Overlapping Basic Service Set Access

In some embodiments, the group of STAs allocated to a wildcard resource can include one or more STAs from a neighboring BSS. For example, wildcard resources can be allocated to STAs from an overlapping basic service set (OBSS). In an embodiment, the wildcard resource assignment can indicate whether or not OBSS STAs are allowed to use the resource. In some embodiments, APs 110 can coordinate to define a group of BSS and OBSS STAs allowed to use the wildcard resource.

In some embodiments, OBSS STAs assigned a wildcard resource can obey the time, frequency synchronization and power control and/or other limitations indicated in the trigger frame in order to make sure the UL MU MIMO or UL OFDMA reception at the AP sender of the trigger frame is successful. Such settings may not be optimal for the reception of the transmissions at the OBSS AP. Thus, usage of wildcard resources by OBSS STAs can be "best effort," as power control issues can potentially impair reception at the OBSS. In some embodiments, different access priority can be assigned to the OBSS STAs. In some embodiments, OBSS transmission can start at a different time from BSS transmission. For example, OBSS STAs can start transmission after BSS STAs have started a HEW portion of a PPDU. In some embodiments, some wildcard resources can be reserved for BSS communications and other wildcard resources can be reserved for OBSS transmissions.

Figure 25:
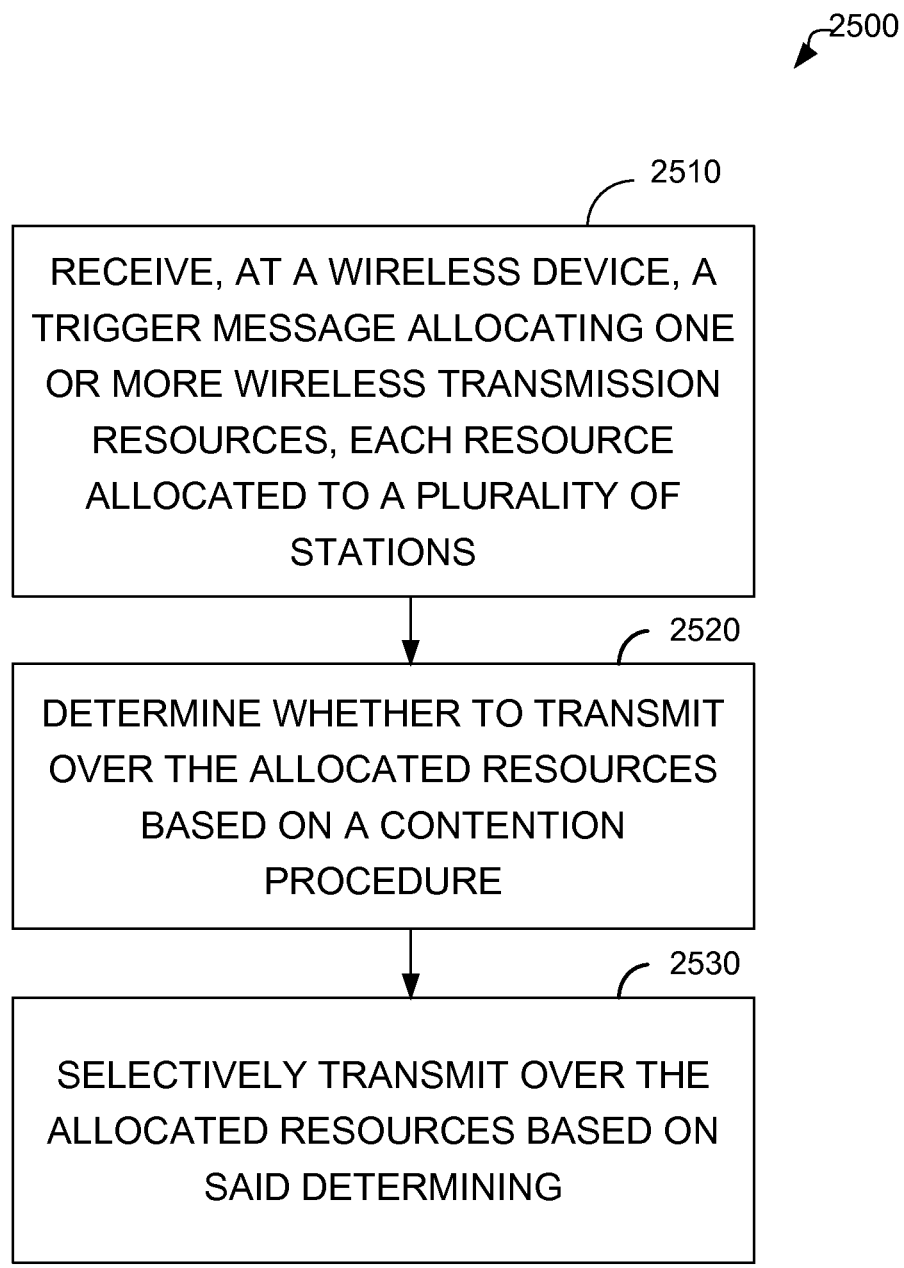
FIG. 25 shows a flowchart for an exemplary method of wireless communication that can be employed within the wireless communication system of FIG. 1.

FIG. 25 shows a flowchart 2500 for an exemplary method of wireless communication that can be employed within the wireless communication system 100 of FIG. 1. The method can be implemented in whole or in part by the devices described herein, such as the AP 110 (FIG. 1), any of the STAs 120a-120hi (FIG. 1), and the wireless device 302 shown in FIG. 3. Although the illustrated method is described herein with reference to the wireless communication system 100 discussed above with respect to FIG. 1, the wireless device 302 discussed above with respect to FIG. 3, and the frames and frame exchanges of FIGS. 4-24, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added.

First, at block 2510, a wireless device receives a trigger message allocating one or more wireless transmission resources, each resource allocated to a plurality of STAs. For example, the STA 120 can receive the trigger frame 2410 from the AP 110. The trigger message can allocate wildcard resources and/or reserved resources.

In various embodiments, the trigger message further allocates one or more wireless transmission resources to a single STA. For example, the trigger frame 2410 can allocate reserved resources. In various embodiments, the plurality of STAs includes one or more STAs of an overlapping basic service set (OBSS).

In various embodiments, the trigger message can specify the plurality of stations via one or more of: a prior allocation indication, a group identifier associated with one or more wildcard resources, a portion of a media access control (MAC) or association identification (AID) address of the plurality of stations, and/or a time synchronization function (TSF) criteria. In various embodiments, including the "group identifier" can refer to the trigger message including, for each of the one or more allocated resources, an identifier identifying a group of STAs to which the resource is allocated to. In various embodiments, the wireless transmission resources can include frequency resources, time resources, or a combination thereof.

Next, at block 2520, the wireless device determines whether to transmit over the allocated resources based on a contention procedure. For example, the STA 120 can contend for the allocated wildcard resources based on any of the pruning methods discussed herein.

In various embodiments, determining whether to transmit includes receiving a pruning threshold value within a range of values. For example, the AP 110 can provide the pruning value p to the STA 120, or the STA 120 can retrieve the value p from storage or independently generate the value p. Said determining further includes generating a pruning value within the range of values. For example, the STA 120 can randomly or pseudo-randomly generate a value within the range of possible p values.

Said determining further includes comparing the pruning value to the pruning threshold value. Said determining further includes determining whether to transmit based on said comparing. For example, in various embodiments the STA 120 can determine to transmit when the pruning value is less than, less than or equal to, greater than, or greater than or equal to, the value p.

In various embodiments, the method can further include receiving a revised pruning threshold based on success or failure of past transmissions. For example, the AP 110 or the STA 120 can decrease the value p when transmissions fail, or collide, and the AP 110 or the STA 120 can increase the value p when transmission succeed, or do not collide (or vice versa).

In various embodiments, determining whether to transmit includes initializing a backoff counter. For example, the STA 120 can identify each trigger frame 2410 as a slot, and can initialize the backoff counter to a default, predetermined, or dynamically determined value, or one received from the AP 110. Said determining further includes modifying the backoff counter based on allocated resources. In various embodiments, the counter is modified or decremented only when allocated resources are idle. In other embodiments, the counter is modified regardless of whether allocated resources are idle. For example, in various embodiments the STA 120 can increment or decrement the backoff counter when a slot is idle.

Said determining further includes determining to transmit when the backoff counter reaches a threshold value. For example, the STA 120 can determine to transmit when the backoff counter reaches zero, or another threshold value. In various embodiments, the method can further include adjusting a backoff window when a collision occurs in the allocated resources. For example, the STA 120 or the AP 110 can increase or decrease the backoff window (for example, by changing the initial value and/or the threshold value) when a collision occurs, or vice versa.

In some embodiments, when the STA 120 has a frame to send, it initializes it's backoff counter to a random value in a preset range. When the STA 120 has a non-zero backoff counter value, it decrements its backoff counter by 1 in every resource unit assigned to a specific AID value. Accordingly, when the STA 120 has a non-zero backoff counter, it decrements its backoff counter by a value equal to the number of resource units assigned to the specific AID. When the STA 120 has a backoff counter decremented to 0 randomly, it randomly selects any one of the assigned resource units for random access and transmits its frame. Moreover, the AP 110 can broadcast at least one parameter in the trigger frame so that STAs can initiate the random access process after the trigger frames.

In various embodiments, determining whether to transmit includes listening to the allocated resources for a listening portion of a preamble period after the trigger message. For example, the STA 120 can listen to the wildcard resources for the backoff period 2460 during the legacy preamble time 2440. Said determining further includes transmitting a padding signal when the allocated resources are idle for a duration of the listening portion, until an end of the preamble period. For example, when the STA 120 does not detect transmissions on the allocated wildcard resources during its backoff period 2460, it can transmit the padding signal 2450. The STA 120 can transmit the padding signal 2450 to align the start of the wildcard PPDU 2430 with the reserved PPDU 2420.

Said determining further includes determining to not to transmit when the allocated resources are not idle for a duration of the listening portion. For example, when the STA 120 detects another STA transmitting a padding signal 2450 during its backoff period 2460, the STA 120 can defer until at least the next trigger frame 2410.

In various embodiments, the method can further include adjusting a length of the listening portion based on a transmission outcome. For example, the AP 110 or the STA 120 can increase the backoff period 2460 when transmissions collide. As another example, the AP 110 or the STA 120 can decrease the backoff period 2460 when the STA 120 is unable to transmit its data, or insufficient data, for a threshold period of time.

Then, at block 2530, the wireless device selectively transmits over the allocated resources based on said determining. For example, the STA 120 can transmit the wildcard PPDU when it successfully completes contention for the wildcard resources. The STA 120 can refrain from transmitting the wildcard PPDU when it does not successfully complete contention for the wildcard resources.

In an embodiment, the method shown in FIG. 25 can be implemented in a wireless device that can include a receiving circuit, a determining circuit, and a selectively transmitting circuit. Those skilled in the art will appreciate that a wireless device can have more components than the simplified wireless device described herein. The wireless device described herein includes only those components useful for describing some prominent features of implementations within the scope of the claims.

The receiving circuit can be configured to receive the trigger message. In an embodiment, the receiving circuit can be configured to implement block 2510 of the flowchart 2500 (FIG. 25). The receiving circuit can include one or more of the receiver 312 (FIG. 3), the transceiver 314 (FIG. 3), the processor 304 (FIG. 3), the DSP 320 (FIG. 3), the signal detector 318 (FIG. 3), and the memory 306 (FIG. 3). In some implementations, means for receiving can include the receiving circuit.

The determining circuit can be configured to determine whether to transmit. In an embodiment, the determining circuit can be configured to implement block 2520 of the flowchart 2500 (FIG. 25). The determining circuit can include one or more of the processor 304 (FIG. 3), the DSP 320 (FIG. 3), and the memory 306 (FIG. 3). In some implementations, means for determining can include the determining circuit.

The selectively transmitting circuit can be configured to selectively transmit a message on the allocated resources. In an embodiment, the selectively transmitting circuit can be configured to implement block 2530 of the flowchart 2500 (FIG. 25). The selectively transmitting circuit can include one or more of the transmitter 310 (FIG. 3), the transceiver 314 (FIG. 3), the processor 304 (FIG. 3), the DSP 320 (FIG. 3), and the memory 306 (FIG. 3). In some implementations, means for selectively transmitting can include the selectively transmitting circuit.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The various operations of methods described above can be performed by any suitable means capable of performing the operations, such as various hardware and/or software component(s), circuits, and/or module(s). Generally, any operations illustrated in the Figures can be performed by corresponding functional means capable of performing the operations.

The various illustrative logical blocks, modules and circuits described in connection with the present disclosure can be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor can be a microprocessor, but in the alternative, the processor can be any commercially available processor, controller, microcontroller or state machine. A processor can also be implemented as a combination of computing devices, e.g., a combination of a DSP and a microprocessor, a plurality of microprocessors, one or more microprocessors in conjunction with a DSP core, or any other such configuration.

In one or more aspects, the functions described can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium can comprise non-transitory computer readable medium (e.g., tangible media). In addition, in some aspects computer readable medium can comprise transitory computer readable medium (e.g., a signal). Combinations of the above should also be included within the scope of computer-readable media.

The methods disclosed herein comprise one or more steps or actions for achieving the described method. The method steps and/or actions can be interchanged with one another without departing from the scope of the claims. In other words, unless a specific order of steps or actions is specified, the order and/or use of specific steps and/or actions can be modified without departing from the scope of the claims.

Further, it should be appreciated that modules and/or other appropriate means for performing the methods and techniques described herein can be downloaded and/or otherwise obtained by a STA and/or base STA as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a STA and/or base STA can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure can be devised without departing from the basic scope thereof, and the scope thereof is determined by the claims that follow.

What is claimed is:

1. A method of wireless communication, comprising:
   receiving, at a wireless device, a trigger message from an access point allocating a first subset of wireless transmission resources of a plurality of wireless transmission resources, wherein:
   the wireless device is from a plurality of stations in wireless communication with the access point over the plurality of wireless transmission resources;

the trigger message allocates the first subset of wireless transmission resources to a first group of stations from the plurality of stations, wherein accessing the first subset of wireless transmission resources by the first group of stations is contention based and the trigger message comprises a collision resolution mechanism related to a data or frame type; and the trigger message allocates each wireless transmission resource from a second subset of wireless transmission resources of the plurality of wireless transmission resources to only one station of the plurality of stations without contention;

determining whether to transmit over the first subset of wireless transmission resources based on the collision resolution mechanism; and selectively transmitting one or more transmissions over the first subset of wireless transmission resources based on the collision resolution mechanism, wherein:

the one or more transmissions from the wireless device over the first subset of wireless transmission resources are time synchronized and frequency synchronized among transmissions by the plurality of stations over the first subset and the second subset of wireless transmission resources; and the collision resolution mechanism limits the number of stations contending for a resource by excluding one or more of the plurality of stations from the trigger message allocations such that the probability that only one station transmits is above a value.

2. The method of claim 1, wherein the trigger message specifies the first group of stations via one or more of: a prior allocation indication, a group identifier associated with the first subset of wireless transmission resources, a portion of a media access control (MAC) or association identification (AID) address of the first group of stations, or a time synchronization function (TSF) criteria.

3. The method of claim 1, wherein determining whether to transmit comprises:
receiving a pruning value within a range of values;
generating a pruning value within the range of values;
comparing the pruning value to the pruning value; and
determining whether to transmit based on the comparing.

4. The method of claim 3, further comprising:
receiving a revised pruning value based on a success or a failure of past transmissions.

5. The method of claim 1, wherein determining whether to transmit comprises:
initializing a backoff counter;
modifying the backoff counter based on access by the first group of stations to the first subset of wireless transmission resources; and
determining to transmit when the backoff counter reaches a value.

6. The method of claim 5, further comprising:
adjusting a backoff window when a collision occurs in attempting to access the first subset of wireless transmission resources.

7. The method of claim 1, wherein determining whether to transmit comprises:
listening to the first subset of wireless transmission resources for a listening portion of a preamble period after the trigger message;
transmitting a padding signal when the first subset of wireless transmission resources are idle for a duration of the listening portion, until an end of the preamble period; and determining to not transmit when the first subset of wireless transmission resources are not idle for a duration of the listening portion.

8. The method of claim 7, further comprising:
adjusting a length of the listening portion based on a transmission outcome.

9. The method of claim 1, wherein the plurality of stations includes one or more stations of an overlapping basic service set (OBSS).

10. The method of claim 1, wherein the one or more transmissions from the wireless device over the first subset of wireless transmission resources are power controlled based on transmissions by the plurality of stations over the first subset and the second subset of wireless transmission resources.

11. A wireless communication apparatus, comprising:
a receiver configured to receive a trigger message from an access point allocating a first subset of wireless transmission resources of a plurality of wireless transmission resources, wherein:
the wireless communication apparatus is from a plurality of stations in wireless communication with the access point over the plurality of wireless transmission resources;
the trigger message allocates the first subset of wireless transmission resources to a first group of stations from the plurality of stations, wherein accessing the first subset of wireless transmission resources by the first group of stations is contention based and the trigger message comprises a collision resolution mechanism related to a data or frame type; and
the trigger message allocates each wireless transmission resource from a second subset of wireless transmission resources of the plurality of wireless transmission resources to only one station of the plurality of stations without contention;
one or more processors;
a memory storing instructions that, when executed by the one or more processors, cause the wireless communication apparatus to perform operations comprising:
determining whether to transmit over the first subset of wireless transmission resources based on the collision resolution mechanism; and
a transmitter configured to selectively transmit one or more transmissions over the first subset of wireless transmission resources based on the collision resolution mechanism, wherein:
the one or more transmissions from the wireless communication apparatus over the first subset of wireless transmission resources are time synchronized and frequency synchronized among transmissions by the plurality of stations over the first subset and the second subset of wireless transmission resources; and
the collision resolution mechanism limits the number of stations contending for a resource by excluding one or more of the plurality of stations from the trigger message allocations such that the probability that only one station transmits is above a value.

12. The wireless communication apparatus of claim 11, wherein the trigger message specifies the first group of stations via one or more of: a prior allocation indication, a group identifier associated with the first subset of wireless transmission resources, a portion of a media access control (MAC) or association identification (AID) address of the first group of stations, or a time synchronization function (TSF) criteria.

13. The wireless communication apparatus of claim 11, wherein determining whether to transmit comprises:
receiving a pruning value within a range of values;
generating a pruning value within the range of values;
comparing the pruning value to the pruning value; and
determining whether to transmit based on the comparing.

14. The wireless communication apparatus of claim 13, wherein the receiver is further configured to:
receive a revised pruning value based on a success or a failure of past transmissions.

15. The wireless communication apparatus of claim 11, wherein determining whether to transmit comprises:
initializing a backoff counter;
modifying the backoff counter based on access by the first group of stations to the first subset of wireless transmission resources; and
determining to transmit when the backoff counter reaches a value.

16. The wireless communication apparatus of claim 15, the operations further comprising:
adjusting a backoff window when a collision occurs in attempting to access the first subset of wireless transmission resources.

17. The wireless communication apparatus of claim 11, wherein determining whether to transmit comprises:
listening to the first subset of wireless transmission resources for a listening portion of a preamble period after the trigger message;
transmitting a padding signal when the first subset of wireless transmission resources are idle for a duration of the listening portion, until an end of the preamble period; and
determining to not transmit when the first subset of wireless transmission resources are not idle for a duration of the listening portion.

18. The wireless communication apparatus of claim 17, wherein determining whether to transmit further comprises:
adjusting a length of the listening portion based on a transmission outcome.

19. The wireless communication apparatus of claim 11, wherein the plurality of stations includes one or more stations of an overlapping basic service set (OBSS).

20. The wireless communication apparatus of claim 11, wherein the one or more transmissions from the wireless communication apparatus over the first subset of wireless transmission resources are power controlled based on transmissions by the plurality of stations over the first subset and the second subset of wireless transmission resources.

21. A wireless communication apparatus, comprising:
means for receiving a trigger message from an access point allocating a first subset of wireless transmission resources of a plurality of wireless transmission resources, wherein:
the wireless communication apparatus is from a plurality of stations in wireless communication with the access point over the plurality of wireless transmission resources;
the trigger message allocates the first subset of wireless transmission resources to a first group of stations from the plurality of stations, wherein accessing the first subset of wireless transmission resources by the first group of stations is contention based and the trigger message comprises a collision resolution mechanism related to a data or frame type; and
the trigger message allocates each wireless transmission resource from a second subset of wireless transmission resources of the plurality of wireless transmission resources to only one station of the plurality of stations without contention;
means for determining whether to transmit over the first subset of wireless transmission resources based on the collision resolution mechanism;
means for selectively transmitting one or more transmissions over the first subset of wireless transmission resources based on the collision resolution mechanism, wherein:
the one or more transmissions from the wireless communication apparatus over the first subset of wireless transmission resources are time synchronized and frequency synchronized among transmissions by the plurality of stations over the first subset and the second subset of wireless transmission resources; and
the collision resolution mechanism limits the number of stations contending for a resource by excluding one or more of the plurality of stations from the trigger message allocations such that the probability that only one station transmits is above a value.

22. The wireless communication apparatus of claim 21, wherein the trigger message specifies the first group of stations via one or more of: a prior allocation indication, a group identifier associated with the first subset of wireless transmission resources, a portion of a media access control (MAC) or association identification (AID) address of the first group of stations, or a time synchronization function (TSF) criteria.

23. The wireless communication apparatus of claim 21, wherein means for determining whether to transmit comprises:
means for receiving a pruning value within a range of values;
means for generating a pruning value within the range of values;
means for comparing the pruning value to the pruning value; and
means for determining whether to transmit based on the comparing.

24. The wireless communication apparatus of claim 23, further comprising:
means for receiving a revised pruning value based on a success or a failure of past transmissions.

25. The wireless communication apparatus of claim 21, wherein means for determining whether to transmit comprises:
means for initializing a backoff counter;
means for modifying the backoff counter based on access by the first group of stations to the first subset of wireless transmission resources; and
means for determining to transmit when the backoff counter reaches a value.

26. The wireless communication apparatus of claim 25, further comprising:
means for adjusting a backoff window when a collision occurs in attempting to access the first subset of wireless transmission resources.

27. The wireless communication apparatus of claim 21, wherein means for determining whether to transmit comprises:
means for listening to the first subset of wireless transmission resources for a listening portion of a preamble period after the trigger message;

means for transmitting a padding signal when the first subset of wireless transmission resources are idle for a duration of the listening portion, until an end of the preamble period; and means for determining to not transmit when the first subset of wireless transmission resources are not idle for a duration of the listening portion.

28. The wireless communication apparatus of claim 27, further comprising:

means for adjusting a length of the listening portion based on a transmission outcome.

29. The wireless communication apparatus of claim 21, wherein the plurality of stations includes one or more stations of an overlapping basic service set (OBSS).

30. The wireless communication apparatus of claim 21, wherein the one or more transmissions from the wireless communication apparatus over the first subset of wireless transmission resources are power controlled based on transmissions by the plurality of stations over the first subset and the second subset of wireless transmission resources.

31. A non-transitory computer-readable medium comprising instructions that, when executed by one or more processors of an apparatus, cause the apparatus to perform a method of wireless communication by performing operations comprising:

receiving a trigger message from an access point allocating a first subset of wireless transmission resources of a plurality of wireless transmission resources, wherein:
the apparatus is from a plurality of stations in wireless communication with the access point over the plurality of wireless transmission resources;
the trigger message allocates the first subset of wireless transmission resources to a first group of stations from the plurality of stations, wherein accessing the first subset of wireless transmission resources by the first group of stations is contention based and the trigger message comprises a collision resolution mechanism related to a data or frame type; and
the trigger message allocates each wireless transmission resource from a second subset of wireless transmission resources of the plurality of wireless transmission resources to only one station of the plurality of stations without contention;

determining whether to transmit over the first subset of wireless transmission resources based on the collision resolution mechanism; and selectively transmitting one or more transmissions over the first subset of wireless transmission resources based on the collision resolution mechanism, wherein:
the one or more transmissions from the apparatus over the first subset of wireless transmission resources are time synchronized and frequency synchronized among transmissions by the plurality of stations over the first subset and the second subset of wireless transmission resources; and
the collision resolution mechanism limits the number of stations contending for a resource by excluding one or more of the plurality of stations from the trigger message allocations such that the probability that only one station transmits is above a value.

32. The medium of claim 31, wherein the trigger message specifies the first group of stations via one or more of: a prior allocation indication, a group identifier associated with the first subset of wireless transmission resources, a portion of a media access control (MAC) or association identification (AID) address of the first group of stations, or a time synchronization function (TSF) criteria.

33. The medium of claim 31, wherein determining whether to transmit comprises:

receiving a pruning value within a range of values;
generating a pruning value within the range of values;
comparing the pruning value to the pruning value; and
determining whether to transmit based on the comparing.

34. The medium of claim 33, the operations further comprising:

receiving a revised pruning value based on a success or a failure of past transmissions.

35. The medium of claim 31, wherein determining whether to transmit comprises:

initializing a backoff counter;
modifying the backoff counter based on access by the first group of stations to the first subset of wireless transmission resources; and
determining to transmit when the backoff counter reaches a value.

36. The medium of claim 35, the operations further comprising:

adjusting a backoff window when a collision occurs in attempting to access the first subset of wireless transmission resources.

37. The medium of claim 31, wherein determining whether to transmit comprises:

listening to the first subset of wireless transmission resources for a listening portion of a preamble period after the trigger message;
transmitting a padding signal when the first subset of wireless transmission resources are idle for a duration of the listening portion, until an end of the preamble period; and
determining to not transmit when the first subset of wireless transmission resources are not idle for a duration of the listening portion.

38. The medium of claim 37, the operations further comprising:

adjusting a length of the listening portion based on a transmission outcome.

39. The medium of claim 31, wherein the plurality of stations includes one or more stations of an overlapping basic service set (OBSS).

40. The medium of claim 31, wherein the one or more transmissions from the apparatus over the first subset of wireless transmission resources are power controlled based on transmissions by the plurality of stations over the first subset and the second subset of wireless transmission resources.

* * * * *